US012783624B2

(12) United States Patent
Singla et al.

(10) Patent No.: US 12,783,624 B2
(45) Date of Patent: Nov. 3, 2026

(54) VOICE-INTERACTION DEVICE FOR ENGAGING IN ACTIVITIES

(71) Applicant: Capital One Financial Corporation, McLean, VA (US)

(72) Inventors: Sanjeev Singla, Novi, MI (US); Ajay Mamgain, Deerfield, IL (US); Jaya Bande, Buffalo Grove, IL (US); Prince Chhabra, Bloomington, IL (US)

(73) Assignee: Capital One Financial Corporation, McLean, VA (US)

( * ) Notice: Subject to any disclaimer, the term of this patent is extended or adjusted under 35 U.S.C. 154(b) by 244 days.

(21) Appl. No.: 18/390,495

(22) Filed: Dec. 20, 2023

(65) Prior Publication Data

US 2025/0209146 A1 Jun. 26, 2025

(51) Int. Cl.
*G06F 21/32* (2013.01)
*G06F 3/16* (2006.01)

(52) U.S. Cl.
CPC .............. *G06F 21/32* (2013.01); *G06F 3/167* (2013.01)

(58) Field of Classification Search
CPC ................................. G06F 21/32; G06F 3/167
See application file for complete search history.

(56) References Cited

U.S. PATENT DOCUMENTS

| | | | | |
|---|---|---|---|---|
| 6,061,666 | A | 5/2000 | Do et al. | |
| 6,527,171 | B1 | 3/2003 | Brooks et al. | |
| 8,055,247 | B1 * | 11/2011 | Gailloux ............. | H04L 65/1059 455/3.06 |

(Continued)

FOREIGN PATENT DOCUMENTS

| | | | |
|---|---|---|---|
| JP | 2007-026011 | A | 2/2007 |
| KR | 10-2343851 | B1 | 12/2021 |
| KR | 10-2023-0086066 | A | 6/2023 |

OTHER PUBLICATIONS

Screen captures from YouTube video clip entitled “FinFreund—The Best Banking App for Visually Impaired Users,” uploaded on May 21, 2017 by user “MoneyCoach UG.” Retrieved from Internet: https://www.youtube.com/watch?v=-VQlzZt1XAc, 2 pages.

(Continued)

*Primary Examiner* — Oleg Survillo

(74) *Attorney, Agent, or Firm* — Lee Sullivan Shea & Smith LLP

(57) ABSTRACT

A voice-interaction device enables a user to engage in certain activities via voice-based interaction and provision of biometric information. The voice-interaction device may be pre-provisioned with identifying information for the voice-interaction device and/or the user that may be used to initially set up the voice-interaction device by provisioning the voice-interaction device with biometric information that is to be used for validating biometric input received by the voice-interaction device. Biometric input received by the voice-interaction device may be validated using stored biometric information to unlock additional functionality of the voice-interaction device, which may involve (i) producing a spoken output of available activities that can be carried out using the voice-interaction device, (ii) receiving a spoken input comprising selection of a given activity that is to be carried out, and (iii) interacting with a back-end computing platform in order to cause the given activity to be carried out.

20 Claims, 8 Drawing Sheets

(56) References Cited

U.S. PATENT DOCUMENTS

| | | | | |
|---|---|---|---|---|
| 8,074,083 | B1 * | 12/2011 | Lee | G06F 21/10<br>713/194 |
| 8,543,506 | B2 | 9/2013 | Grandcolas et al. | |
| 9,318,108 | B2 | 4/2016 | Gruber et al. | |
| 11,683,302 | B2 * | 6/2023 | Woodard | H04W 12/009<br>726/17 |
| 12,093,925 | B1 * | 9/2024 | Singla | G07F 7/0846 |
| 2018/0181082 | A1 * | 6/2018 | Mitter | G06F 21/316 |
| 2018/0218739 | A1 * | 8/2018 | Park | G10L 17/06 |
| 2018/0285881 | A1 * | 10/2018 | Lee | G06Q 20/40145 |
| 2019/0200223 | A1 * | 6/2019 | Wong | H04W 12/06 |
| 2019/0354787 | A1 * | 11/2019 | Fong | G06F 18/217 |
| 2020/0252457 | A1 * | 8/2020 | Zakrzewski | H04L 9/0637 |
| 2021/0303666 | A1 * | 9/2021 | Mitter | G06F 21/445 |
| 2022/0005046 | A1 | 1/2022 | Kim et al. | |
| 2022/0157079 | A1 * | 5/2022 | Davidson | A24F 40/42 |
| 2023/0119154 | A1 * | 4/2023 | Weis | G06F 3/011<br>715/727 |
| 2024/0256600 | A1 * | 8/2024 | Ng | G06F 16/638 |
| 2025/0053626 | A1 * | 2/2025 | Agrawal | G06F 21/32 |

OTHER PUBLICATIONS

Amazon Echo Banking: Let Alexa Check your Balance, Make Payments, and More [online], [retrieved Aug. 23, 2023], Retrieved from the Internet:<URL:www.androidpolice.com/amazon-echo-banking-details-banking/#:~:text=Echo>, 9 pages.

Accessible Banking Fact Sheet—Bank of America [online], [retrieved Aug. 23, 2023], Retrieved from the Internet:<URL: www.bankofamerica.com/accessible-banking/fact-sheet/>, 3 pages.

First Voice-Enabled Card in the World, the Papara Voice Card—Papara [online], [retrieved Aug. 23, 2023], Retrieved from the Internet:<URL: https://www.papara.com/en/voice-card-lp>, 3 pages.

International Searching Authority. International Search Report and Written Opinion issued in International Application No. PCT/US2024/060113, mailed on Apr. 8, 2025, 7 pages.

* cited by examiner

VOICE-INTERACTION DEVICE FOR ENGAGING IN ACTIVITIES

BACKGROUND

People today rely heavily on software applications running on client devices (e.g., smartphones, tablets, personal computers, etc.) to engage in many day-to-day activities in a quicker and more efficient way. As some representative examples, people may use software applications for accessing and managing their financial accounts or software applications for ordering goods and/or services of various different types (e.g., retail goods, rideshare services, food delivery services, etc.)—which may conveniently reduce or eliminate the need for people to engage in such activities in person or over the phone. In most cases, software applications such as these require a user to view a graphical user interface (GUI) displayed on the user's client device and/or provide input via one or more of a keyboard, a mouse, or a touch screen. In other words, software applications such as these commonly require a user to engage in interaction that relies upon the user's ability to visually see the output and input interfaces of the client device, which may be referred to herein as "visual-based interaction."

However, it can be difficult or sometimes impossible for people with visual impairments to use client devices installed with software applications that require visual-based interaction, which negatively impacts the quality of life of people with visual impairments because they cannot take advantage of the conveniences provided by these software applications. For example, if people with visual impairments are unable to use the available software applications for accessing and managing their financial accounts, then they may be forced to conduct all of their financial activity either in person or over the phone, which typically requires more time and effort (especially for in-person activity) and in some cases could also be less secure. As such, there remains a need for technology that allows people with visual impairments to engage in certain activities electronically by using a client device installed with software that does not require visual-based interaction.

Overview

Disclosed herein is a voice-interaction device and associated functionality for facilitating at least one activity via voice-based interaction with the voice-interaction device.

In one aspect, the disclosed voice-interaction device may comprise a biometric sensor, an audio output interface, an audio input interface, at least one processor, at least one non-transitory computer-readable medium, and program instructions stored on the at least one non-transitory computer-readable medium that are executable by the at least one processor such that the voice-interaction device is configured to perform functionality involving (i) operate in a first mode in which the voice-interaction device monitors for biometric input, (ii) while operating in the first mode, receive a biometric input via the biometric sensor, (iii) validate the biometric input and thereby determine that the biometric input is valid, (iv) based on determining that the biometric input is valid, transition from operating in the first mode to operating in a second mode in which the voice-interaction device is configured to facilitate selection by a given user of an available activity via voice-based interaction with the voice-interaction device, and (v) while operating in the second mode, (a) produce, via the audio output interface, a first spoken output that indicates at least one activity that is available for selection by the given user via voice-based interaction, (b) receive, via the audio input interface, a spoken input from the given user, (c) based on an analysis of the spoken input, determine that the spoken input indicates a selection of a given activity that is available for selection by the given user, and (d) based on determining that the spoken input indicates selection of the given activity, cause the given activity to be initiated.

The biometric sensor and the biometric input may take various forms, and in one example embodiment, may comprise a fingerprint sensor and a fingerprint input, respectively.

The functionality for validating the biometric input and thereby determining that the biometric input is valid may take various forms, and in one example embodiment, may involve (i) capturing the biometric input, (ii) generating a representation of the captured biometric input, (iii) comparing the generated representation of the captured biometric input against one or more stored biometric representations to determine whether or not the generated representation of the captured biometric input matches any stored biometric representation, and (iv) determining that the generated representation of the captured biometric input matches a stored biometric representation.

The functionality for causing the given activity may take various forms, and in one example embodiment, may involve (i) transmitting, to a computing platform configured to facilitate activities selected by the given user, a request on behalf of the given user to facilitate the given activity, (ii) receiving, from the computing platform, a response to the request, and (iii) producing, via the audio output interface, a second spoken output indicating the response to the request. In such an embodiment, the request on behalf of the given user to facilitate the given activity may include (i) an indication that the voice-interaction device has successfully authenticated the given user and (ii) an indication of the given activity. Further, the indication that the voice-interaction device has successfully authenticated the user may comprise a data communication confirming that the given user is authorized to engage in the given activity. Further yet, the data communication may be encrypted using a randomly generated, unique code that indicates a particular decrypting algorithm that is to be used by the computing platform to decrypt the data communication.

The at least one activity that is available for selection by the given user via voice-based interaction may take various forms, and in one example embodiment may include at least one of (i) checking an account balance for a given financial account, (ii) scheduling a payment related to a given financial account, or (iii) transferring funds from a first financial account to a second financial account.

In one example embodiment, the first spoken output that indicates the at least one activity that is available for selection by the given user via voice-based interaction may further indicate, for each respective activity, one or more corresponding responses that may be spoken by the given user to indicate selection of the respective activity.

In one example embodiment, the disclosed functionality for facilitating the at least one via voice-based interaction with the voice-interaction device may further comprise (i) before determining that the biometric input is valid, determining that the biometric input is not valid, (ii) receiving a second spoken input indicating a request to store the biometric input, and (iii) based on the request, authenticating the given user for storing the biometric input. In such an embodiment, the functionality for authenticating the given user for storing the biometric input may comprise (i) transmitting, to a computing platform configured to authenticate the given user, a request to issue an original user verification code to the given user, (ii) receiving a third spoken input comprising a spoken user verification code, (iii) based on a comparison of (a) the spoken user verification code and (b) the original user verification code, determining that the spoken user verification code matches the original user verification code and thereby determining that the spoken user verification code is valid, and (iv) based on determining that the spoken user verification code is valid, store a captured representation of the biometric input.

In one example embodiment, the disclosed functionality for facilitating the at least one via voice-based interaction with the voice-interaction device may further comprise (i) using one or more speech processing techniques to generate a text representation of the spoken user verification code, (ii) transmitting, to the computing platform, a request to verify the spoken user verification code, wherein the request includes the text representation of the spoken user verification code, and (iii) receiving, from the computing platform, a response indicating that the text representation of the spoken user verification code matches the original user verification code.

In one example embodiment, the disclosed functionality for facilitating the at least one via voice-based interaction with the voice-interaction device may further comprise (i) using one or more speech processing techniques to generate a text representation of the spoken user verification code (ii) obtaining, from the computing platform, a text representation of the original user verification code, and (iii) comparing (a) the text representation of the spoken user verification code and (b) the text representation of the original user verification code to determine if the spoken user verification code matches the original user verification code.

In one example embodiment, the disclosed functionality facilitating the at least one via voice-based interaction with the voice-interaction device may further comprise (i) continuing to monitor for receipt of the biometric input until the given activity is completed.

In another aspect, disclosed herein is a non-transitory computer-readable medium that is provisioned with program instructions that, when executed by at least one processor, cause a voice-interaction device to perform any of the functionality disclosed herein, including functionality for facilitating at least one via voice-based interaction with the voice-interaction device that involves: (i) operating in a first mode in which the voice-interaction device monitors for biometric input, (ii) while operating in the first mode, receiving a biometric input via the biometric sensor, (iii) validating the biometric input and thereby determining that the biometric input is valid, (iv) based on determining that the biometric input is valid, transitioning from operating in the first mode to operating in a second mode in which the voice-interaction device is configured to facilitate selection by a given user of an available activity via voice-based interaction with the voice-interaction device, and (v) while operating in the second mode, (a) producing, via the audio output interface, a first spoken output that indicates at least one activity that is available for selection by the given user via voice-based interaction, (b) receiving, via the audio input interface, a spoken input from the given user, (c) based on an analysis of the spoken input, determining that the spoken input indicates a selection of a given activity that is available for selection by the given user, and (d) based on determining that the spoken input indicates selection of the given activity, causing the given activity to be initiated.

In yet another aspect, disclosed herein is a method carried out by a voice-interaction device that involves (i) operating in a first mode in which the voice-interaction device monitors for biometric input, (ii) while operating in the first mode, receiving a biometric input via the biometric sensor, (iii) validating the biometric input and thereby determining that the biometric input is valid, (iv) based on determining that the biometric input is valid, transitioning from operating in the first mode to operating in a second mode in which the voice-interaction device is configured to facilitate selection by a given user of an available activity via voice-based interaction with the voice-interaction device, and (v) while operating in the second mode, (a) producing, via the audio output interface, a first spoken output that indicates at least one activity that is available for selection by the given user via voice-based interaction, (b) receiving, via the audio input interface, a spoken input from the given user, (c) based on an analysis of the spoken input, determining that the spoken input indicates a selection of a given activity that is available for selection by the given user, and (d) based on determining that the spoken input indicates selection of the given activity, causing the given activity to be initiated.

One of ordinary skill in the art will appreciate as well as numerous other aspects in reading the following disclosure.

Figure 1:
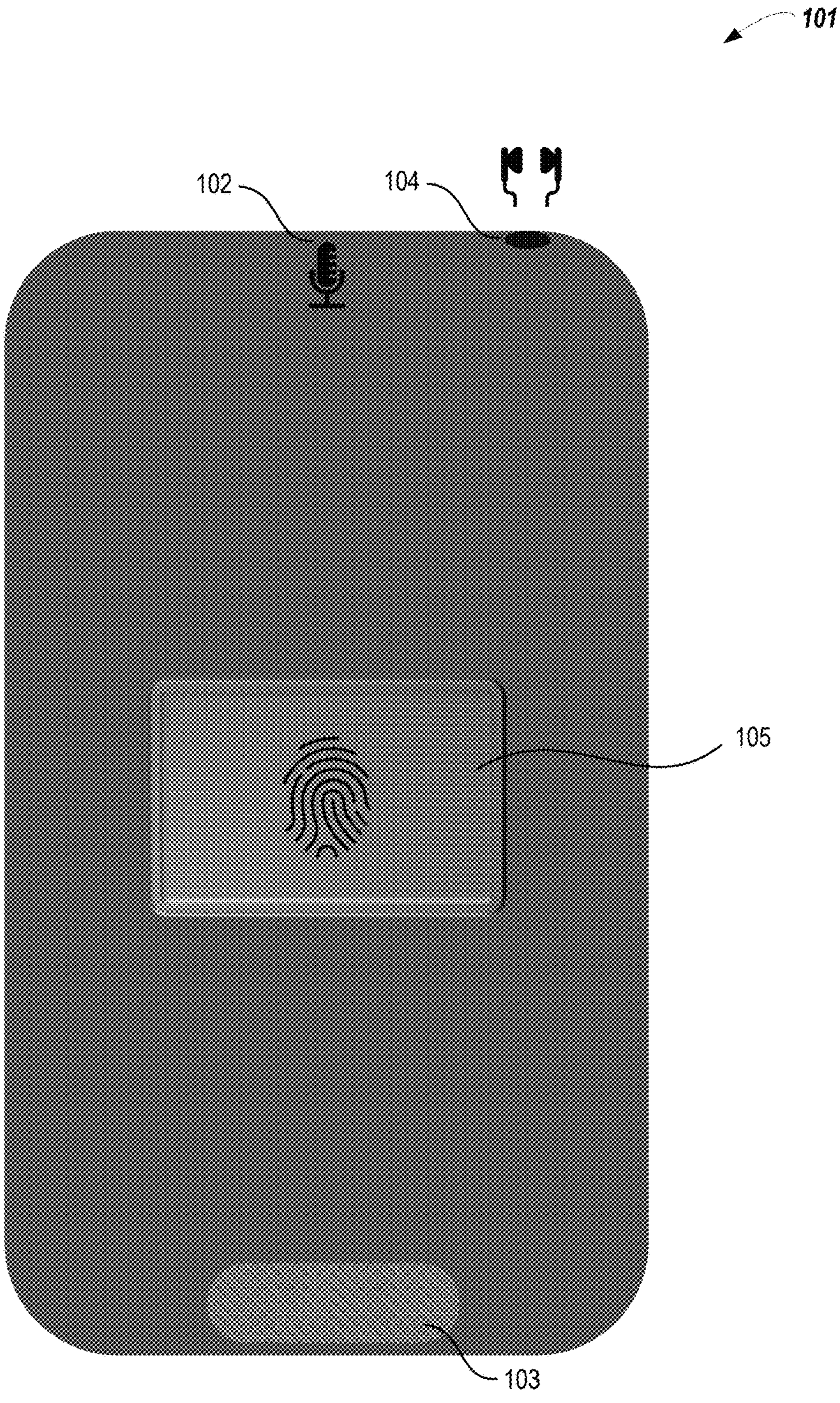
FIG. 1 depicts a view of an example voice-interaction device, in accordance with one embodiment of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As mentioned above, people today rely heavily on software applications running on client devices (e.g., smartphones, tablets, personal computers, etc.) to engage in many day-to-day activities in a quicker, more efficient, and more convenient way. As some representative examples, people may use software applications for accessing and managing their financial accounts or software applications for ordering goods and/or services of various different types (e.g., retail goods, rideshare services, food delivery services, etc.)—which may conveniently reduce or eliminate the need for people to engage in such activities in person or over the phone.

In most cases, software applications such as these require a user to view a graphical user interface (GUI) displayed on the user's client device and/or provide input via one or more of a keyboard, a mouse, or a touch screen. In other words, software applications such as these commonly require a user to engage in interaction that relies upon the user's ability to visually see the output and input interfaces of the client device, which as noted above may be referred to herein as "visual-based interaction."

For example, in order to use a software application for accessing and managing a user's financial accounts, the user is typically required to select the software application from a listing of software applications that are displayed by the user's client device, provide user authentication information for the software application (e.g., username and password, etc.) via one or more forms of visual-based input (e.g., touch, keyboard, and/or mouse input), visually perceive a GUI for the software application that presents various different options for activities related to accessing and/or managing the user's financial accounts, and then interact with the GUI via one or more forms of visual-based input (e.g., touch, keyboard, and/or mouse input) in order to select an activity to engage in with respect to the user's financial account, among other possible examples of visual-based interaction that may be required by such a software application.

As another example, in order to use a software application for ordering goods and/or services, the user is typically required to select the software application from a listing of software applications that are displayed by the user's client device, provide user authentication information for the software application (e.g., username and password, etc.) via one or more forms of visual-based input (e.g., touch, keyboard, and/or mouse input), visually perceive a GUI for the software application that presents various different options for activities related to ordering goods and/or services, and then interact with the GUI via one or more forms of visual-based input (e.g., touch, keyboard, and/or mouse input) in order to select an activity to engage in with respect to the user's ordering of goods and/or services, among other possible examples of visual-based interaction that may be required by such a software application.

Many other types of software applications require visual-based interaction as well.

However, it can be difficult or sometimes impossible for people with visual impairments to use client devices installed with software applications that require visual-based interaction, which negatively impacts the quality of life of people with visual impairments because they cannot take advantage of the conveniences provided by these software applications. For example, if people with visual impairments are unable to use the available software applications for accessing and managing their financial accounts, then they may be forced to conduct all of their financial activity either in person or over the phone, which typically requires more time and effort (especially for in-person activity) and in some cases could also be less secure.

As software technology continues to advance, some software applications now allow users to engage in certain activities via voice-based interaction, such as by allowing a user to input text into certain fields or make certain selections via voice input. However, these software applications still require users to engage in some level of visual-based interaction as well—it is generally not possible to interact with a software application from beginning to end (e.g., by performing all necessary interaction to engage in an activity) via voice interaction. And these software applications are generally designed to be installed and run on general-purpose client devices with visual-based modalities such as display screens, touch interfaces, keyboards, or the like, which typically require some level of visual-based interaction in order to operate the client device.

Accordingly, there remains a need for technology that allows people with visual impairments to engage in certain activities electronically by using a client device installed with software that does not require visual-based interaction.

To address these and other problems, disclosed herein is a new voice-interaction device that is specifically designed to enable a user to engage in certain activities via voice-based interaction, along with related functionality for setting up the voice-interaction device and facilitating activities requested by the user while using the voice-interaction device. In accordance with the present disclosure, the voice-interaction device may be provisioned with biometric information for the user (e.g., a fingerprint) that is used to "unlock" additional functionality of the voice-interaction device, which may involve (i) producing a spoken output indicating a list of options for available activities that can be carried out using the voice-interaction device, (ii) receiving a spoken input comprising a selection of an activity to carry out, and (iii) interacting with a back-end computing platform and/or the user in order to cause the selected activity to be carried out, among other possible functionality. (As used herein, the term "spoken output" refers to any audible output of natural language that may be produced by the voice-interaction device). In this way, the disclosed voice-interaction device may allow a user to carry out certain activities via a biometric input and voice-based interaction instead of requiring the types of visual-based interaction described above, which may be more suitable for use by visually-impaired people. Additionally, as described in detail below, the disclosed voice-interaction device and related functionality may include additional features for enhancing the security of the user's voice-based interaction with the voice-interaction device.

In the examples below, the voice-interaction device is at times discussed in the context of enabling a user to engage in activities relating to financial accounts, but it should be understood that this is merely for purposes of illustration and the disclosed voice-interaction device may be used to engage in other types of activities as well, such as activities relating to other types of accounts (e.g., an account for an e-commerce platform or the like).

FIG. 1 depicts a simplified illustration of an example voice-interaction device 101 in accordance with one embodiment of the disclosed technology. The voice-interaction device 101 may have a shape and size that allows it to be comfortably held by a user. For instance, the voice-interaction device 101 may have a shape and size that is comparable to a device such as a dictation device, a beeper, or a remote, among other examples. However, it should be understood that the voice-interaction device may take other physical forms as well.

The voice-interaction device 101 may include various hardware and software components, some of which are shown in FIG. 1.

For instance, as one possibility, the voice-interaction device 101 may include one or more processors (not shown) each comprising one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

As another possibility, the voice-interaction device 101 may include data storage (not shown) comprising one or more non-transitory computer-readable storage mediums that are collectively configured to store (i) program instructions that are executable by the one or more processors and when executed, cause the voice-interaction device 101 to perform one or more of the functions disclosed herein, and (ii) data that may be received, derived, or otherwise stored by the voice-interaction device 101. In this respect, the one or more non-transitory computer-readable storage mediums of the data storage may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage may take other forms and/or store data in other manners as well.

As yet another possibility, the voice-interaction device 101 may include a battery component (not shown) that serves to receive and supply power to the various components of the voice-interaction device 101, which may take various forms. As one example, the battery component may comprise an internal rechargeable battery that may be charged by coupling an external power source to the voice-interaction device 101. For instance, the battery may be charged directly via a charging port of the voice-interaction device 101 or wirelessly via a wireless charging station, among other possibilities. As another example, the battery component may comprise a removable battery component that may be recharged and/or replaced. Other examples are also possible.

Further, as another possibility, the voice-interaction device 101 may include a power button and associated circuitry (not shown) that enables a user to power the voice-interaction device 101 on or off.

Further yet, as another possibility, the voice-interaction device 101 may include one or more communication interfaces (not shown) that may be configured to facilitate wireless and/or wired communication with other computing devices and/or computing systems. The communication interface(s) may take any of various forms, examples of which may include an Ethernet interface, a serial bus interface (e.g., Firewire, USB 3.0, etc.), one or more chips and/or antennas that enable the voice-interaction device 101 to communicate using any suitable wireless communication protocol and/or any other interface that provides for any of various types of wireless communication (e.g., Wi-Fi communication, cellular communication, cloud communication, Bluetooth, and/or short-range wireless protocols, etc.) and/or wired communication. Other configurations are possible as well.

In a preferred embodiment, the voice-interaction device 101 may include at least one wireless communication interface that is configured to engage in secure communication with a back-end computing platform involved in facilitating the types of activities disclosed herein, such as communication that is carried out according to a Voice over Internet Protocol (VOIP), which may provide enhanced security relative to the types of protocols that are typically used by end-user devices (e.g., smartphones) to engage in communication with a back-end computing platform. However, the one or more communication interfaces of the voice-interaction device 101 may take other forms and/or engage in communication according to other protocols as well.

Further still, as another possibility, the voice-interaction device 101 may include an input/output (I/O) interface that may take various forms. The I/O interface may generally take the form of (i) one or more input interfaces that are configured to receive and/or capture information at the voice-interaction device 101, such as a microphone, and (ii) one or more output interfaces that are configured to output information from the voice-interaction device 101, such as a speaker and/or a headphone interface. For instance, as shown in FIG. 1, the I/O interface of the voice-interaction device 101 may include a microphone 102 that is configured to receive voice input from a user, a speaker 103 that is configured to output audio to a user via audible sound waves, and a headphone interface 104 that is configured to output audio to a user via a headphone device that is connected to the headphone interface 104. The I/O interface of the voice-interaction device 101 may take other forms as well.

In preferred embodiments, the voice-interaction device 101 of FIG. 1 may be configured to use the speaker 103 for audible system notifications or the like (e.g., a low battery notification) and to use the headphone interface 104 for spoken output related to the voice-based interaction with a user, which enhances the security of the voice-interaction device 101 by avoiding (or at least reducing) the chances of someone else overhearing the spoken output produced by the voice-interaction device 101, which could include potentially include certain information that the user would prefer to keep private (e.g., information about one of the user's financial accounts, such as an account balance). Thus, in these preferred embodiments, a user will be unable to engage in a voice-based interaction session with the voice-interaction device 101 unless there is a headphone device connected to the headphone interface 104.

However, in other embodiments, it is possible that the voice-interaction device 101 of FIG. 1 could be configured to use the speaker 103 for spoken output related to the voice-based interaction with a user in at least some circumstances (e.g., when there is no headphone device connected to the voice-interaction device 101). For instance, as one possibility, the voice-interaction device 101 of FIG. 1 could be configured to seek a user's permission to use the speaker 103 for spoken output during a particular voice-based interaction session with the user (e.g., via an initial voice-based exchange with the user), and if the user agrees, then the voice-interaction device 101 may use the speaker for spoken output during that voice-based interaction session-which would provide the user with the choice of receiving spoken output via the speaker 103 in situations where the user feels comfortable doing so. Or as another possibility, the voice-interaction device 101 of FIG. 1 could be configured to automatically use the speaker 103 for spoken output if there is no headphone device connected to the voice-interaction device 101, which may provide a more seamless user experience for users that prefer not to use a headphone device but may present an increased risk that sensitive information about the user could be overheard by others, which is less secure than the foregoing embodiments. Other embodiments are possible as well.

As yet another possibility, the voice-interaction device 101 may include a biometric sensor 105 that serves to receive biometric input. In the example shown in FIG. 1, the biometric sensor 105 comprises a fingerprint reader that is capable of receiving a fingerprint input. However, it should be understood that the biometric sensor 105 may take other forms as well, such as a facial scanner or a retinal scanner, among other possibilities, or may take the form of a combination of different components that serve to receive other types of biometric input(s).

In line with a preferred embodiment, the example voice-interaction device 101 of FIG. 1 is not shown to include components for facilitating visual-based interaction with the voice-interaction device 101, such as a display screen, a light-based indicator, a touchscreen, a navigation pad, a physical keyboard, or the like. That is because, in line with the discussion above, the voice-interaction device 101 may be designed for the specific purpose of enabling a user to engage with the voice-interaction device 101 primarily via voice-based interaction. However, in other embodiments, it is possible the voice-interaction device disclosed herein could include certain types of components that enable a user to optionally engage in visual-based interaction with the voice-interaction device 101, as long as the voice-interaction device 101 does not necessarily require the user to utilize such components in order to interact with the voice-interaction device 101 (or at least does not require the user to utilize such components for all use cases) and instead enables the user to engage in at least certain types of activities via a combination of biometric input via a biometric sensor, spoken inputs via a microphone, and spoken outputs via a headphone device or a speaker.

Further, in accordance with the present disclosure, the example voice-interaction device 101 of FIG. 1 may be installed with software that provides the voice-interaction device 101 with the capability to carry out the functionality disclosed herein related to setting up the voice-interaction device 101 and then facilitating activities being requested by a user of the voice-interaction device 101 via voice-based interaction. This software is described in further detail below. In a preferred embodiment, the software that is installed on the example voice-interaction device 101 of FIG. 1 will generally be limited to software that is related to carrying out the functionality disclosed herein, and will not include additional software for carrying out other tasks as would be the case for a general-purpose end-user device (e.g., a smartphone). This may enhance the security of the voice-interaction device 101 relative to a general-purpose end-user device (e.g., a smartphone), because it avoids (or at least reduces) the risk that other software on the device could gain access to sensitive information about the user. However, in other embodiments, it is possible that the example voice-interaction device 101 could be installed with additional software that is not related to the functionality disclosed herein (e.g., software for engaging in certain types of visual-based interaction with the device).

In accordance with the present disclosure, a voice-interaction device may be configured to communicate with a back-end computing platform that is configured to carry out functionality related to both setting up the voice-interaction device and facilitating the activities being requested by a user of the voice-interaction device via voice-based interaction. In practice, such a back-end computing platform may be operated by the business organization that issued the voice-interaction device to the user, although other arrangements are possible as well. Additionally, in at least some embodiments, the functionality related to setting up the voice-interaction device may involve a separate end-user device associated with the user of the voice-interaction device, such as a smartphone, a tablet, a computer, or the like.

Figure 2:
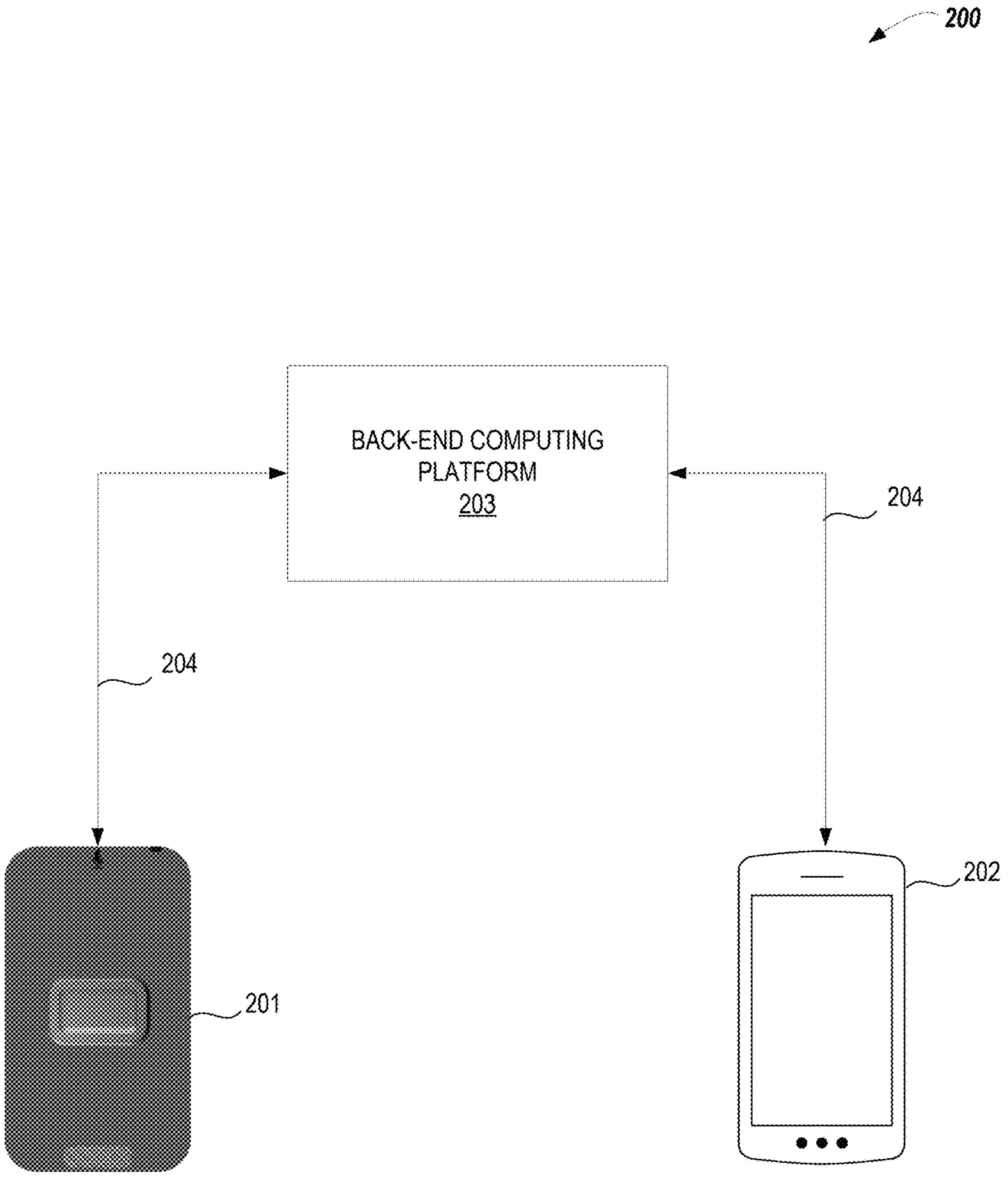
FIG. 2 depicts an example of a computing environment in which the disclosed voice-interaction device may operate, in accordance with one embodiment of the disclosed technology.

One example of a computing environment 200 in which the disclosed voice-interaction device may operate is shown in FIG. 2. As shown, the example computing environment 200 may include (i) a voice-interaction device 201, (ii) an end-user device 202, and (iii) a back-end computing platform 203.

The voice-interaction device 201 may comprise any device that is configured to carry out the voice-interaction device functionality disclosed herein, including but not limited to functionality for enabling a user to engage in one or more activities via voice-based interaction, and as one possible example, the voice-interaction device 201 may take the form of the example voice-interaction device 101 discussed above with reference to FIG. 1. However, the voice-interaction device 201 may take other forms as well.

In line with the discussion above, the voice-interaction device 201 may be issued by any of various types of business organizations. For instance, as one possible use case, the voice-interaction device 201 may be issued by a financial institution that maintains financial accounts for its customers and wishes to enable certain of its existing or prospective customers (e.g., visually-impaired customers) to engage in activities related to their financial accounts via secure, voice-based interactions. As another possible use case, the voice-interaction device 201 may be issued by an e-commerce platform provider that maintains e-commerce accounts for its customers and wishes to enable certain of its existing or prospective customers (e.g., visually-impaired customers) to engage in activities related to their e-commerce accounts via secure, voice-based interactions. The voice-interaction device 201 may be issued by other types of business organizations as well, and other use cases are possible as well.

The end-user device 202 may be any end-user device that is associated with a user to whom the voice-interaction device 201 is issued and is capable of carrying out the end-user device functionality disclosed herein, including but not limited to functionality for setting up the voice-interaction device 201 (as will be explained in more detail further below). The end-user device 202 may take any of various forms, examples of which may include a smartphone, a tablet, a desktop computer, a laptop computer, a netbook, and/or a personal digital assistant (PDA), among other possibilities.

The back-end computing platform 203 may comprise any one or more computer systems (e.g., one or more servers) that have been installed with software for carrying out the back-end computing platform functionality disclosed herein, including but not limited to functionality for setting up a voice-interaction device and then facilitating activities being requested by a user of the voice-interaction device via voice-based interaction (as will be explained in more detail further below).

In practice, the one or more computer systems of the back-end computing platform 203 may generally comprise some set of physical computing resources (e.g., processors, data storage, communication interfaces, etc.), which may take any of various forms. As one possibility, the back-end computing platform 203 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the back-end computing platform 203 may comprise "on-premises" computing resources of the organization that operates the back-end computing platform 203 (e.g., organization-owned servers). As yet another possibility, the back-end computing platform 203 may comprise a combination of cloud computing resources and on-premises computing resources.

Further, in practice, software on the back-end computing platform 203 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

In line with the discussion above, the back-end computing platform 203 may be operated by the same business organization that is responsible for issuing the voice-interaction device 201 to the user, which could take any of various forms depending on the use case for the voice-interaction device 201, examples of which may include a financial institution or an e-commerce platform provider. However, other arrangements are possible as well, including but not limited to the possibility that the back-end computing platform 203 could be operated by a different business organization than the one that issued the voice-interaction device 201.

As shown in FIG. 2, voice-interaction device 201 and the end-user device 202 may each be configured to communicate with the back-end computing platform 203 over a respective communication path 204. Each respective communication path 204 may generally comprise one or more data networks and/or data links, which may take any of various forms. For instance, each respective communication path 204 may include any one or more of a personal area network (PAN), a local area network (LAN), a wide area network (WAN) such as the Internet and/or a cellular network, a cloud network, and/or a point-to-point data link, among other possibilities, where each such data network and/or link may be wireless, wired, or some combination thereof, and may carry data according to any of various different communication protocols, including but not limited to VoIP. Additionally, at least some aspects of the communication between the voice-interaction device 201 and/or the end-user device 202 and the back-end computing platform 203 may be carried out via an Application Programming Interface (API) provided by the back-end computing platform 203, among other possibilities. Although not shown, the respective communication paths 204 may also include one or more intermediate systems, examples of which may include a data aggregation system and host server, among other possibilities. Many other configurations are also possible.

It should be understood that the computing environment 200 is one example of a computing environment in which the disclosed voice-interaction device may operate, and that numerous other examples of computing environments are possible as well-including but not limited to the possibility that the computing environment 200 may include additional devices, systems, and/or platforms that could be involved in the disclosed functionality of setting up the voice-interaction device 201 or facilitating the activities being requested by a user of the voice-interaction device 201 via voice-based interaction (e.g., a computing platform that is contacted by the back-end computing platform 203 during the process of facilitating a given activity being requested by a user of the voice-interaction device 201), among other examples.

For purposes of illustration and discussion, the disclosed functionality for setting up a voice-interaction device and then facilitating activities being requested by a user of the voice-interaction device via voice-based interaction will be described below in the context of the example computing environment 200.

As noted above, in practice, the voice-interaction device 201 may be issued to a user by a business organization, such as a financial institution or an e-commerce platform provider, among other possibilities. In this respect, the voice-interaction device 201 may be issued to the user by the business organization itself or by a third-party organization acting on behalf of the business organization, among other possibilities.

The user to which the voice-interaction device 201 is issued may be associated with the business organization in various ways. For instance, the user may be an existing or prospective customer of the business organization, or a member of a beta program or a focus group associated with the business organization tasked with testing products and/or services offered by the business organization, as some possibilities. In this respect, the user may have a known presence with the business organization, which may be referred to herein as having one or more "accounts" with the business organization. The user's one or more accounts may take various forms depending on the business organization. For instance, if the business organization is a financial institution, a user's one or more accounts may comprise a financial account, such as a deposit account, a credit card account, an investment account, etc., along with a "login" account that enables the user to electronically access their financial account(s)—e.g., such as by providing a username and password to access an electronic user portal provided by the business organization and then selecting a financial account for performing one or more activities. Other examples are also possible.

Further, the circumstances that may cause the voice-interaction device 201 to be issued to the user may take various forms. For instance, as one possibility, the voice-interaction device 201 may be issued to the user based on a request from the user for the voice-interaction device 201. As another possibility, the voice-interaction device 201 may be issued to the user based on the business organization determining that the user meets some condition that qualifies the user for receiving the voice-interaction device 201 (e.g., the user is known to have a visual impairment, the user is a member of a beta program or focus group tasked with testing the voice-interaction device 201 etc.).

In any event, after it is determined that the voice-interaction device 201 is to be issued to the user, the voice-interaction device 201 may be provisioned with identifying information for the voice-interaction device 201 and/or the user to which the voice-interaction device 201 is to be issued. The identifying information may include various types of information.

As one possibility, the identifying information that is provisioned on the voice-interaction device 201 may comprise a device identifier that serves to uniquely identify the voice-interaction device 201. The device identifier may take various forms. For instance, as one example, the device identifier may take the form of a Media Access Control (MAC) address for the voice-interaction device 201. Other examples are also possible.

As another possibility, the identifying information that is provisioned on the voice-interaction device 201 may comprise user information that serves to identify the user to whom the voice-interaction device 201 is to be issued. The user information may take various forms. As one example, the user information may comprise a name of the user. As another example, the user information may comprise one or more forms of contact information for the user, such as a phone number, an email address, a mailing address, etc. Other examples are also possible.

The identifying information that is provisioned on the voice-interaction device 201 may take other forms as well.

Further, in practice, the business organization may create and/or update a data record for the user so as to memorialize at least a portion of the identifying information that is provisioned on the voice-interaction device 201. For instance, if the business organization is already maintaining a data record (e.g., an electronic data record stored at a back-end computing platform operated by the business organization) for the user that contains identifying information for the user and/or the user's accounts, the business organization may update that data record to include the device identifier for the voice-interaction device 201 and perhaps also additional identifying information for the user. Alternatively, the business organization may create a new data record for the user (e.g., an electronic data record stored at a back-end computing platform operated by the business organization) that contains identifying information for the user and/or the user's accounts as well as a device identifier of the voice-interaction device (which may also be linked or associated in some way to another data record for the user and/or the user's accounts). The business organization may memorialize the identifying information that is provisioned on the voice-interaction device 201 in other manners as well.

In a preferred embodiment, the identifying information that is provisioned on the voice-interaction device 201 will not include any sensitive information, such as account numbers, fingerprint information, or the like, that could expose the user to fraud or theft if obtained by a malicious party However, in other embodiments, it is possible that the identifying information provisioned on the voice-interaction device 201 could include some form of sensitive information that is thereafter utilized to carry out certain of the functionality disclosed herein.

After the voice-interaction device 201 has been provisioned with the identifying information, the voice-interaction device 201 may be provided to the user. For instance, as one possibility, the voice-interaction device 201 may be sent to a mailing address associated with the user. As another possibility, the voice-interaction device 201 may be retrieved by the user from a pick-up site associated with the business organization (e.g., a branch of the business organization, etc.). Other examples are also possible.

In any event, once the voice-interaction device 201 is received by the user, the user may set up the voice-interaction device by provisioning it with biometric information (e.g., fingerprint information, etc.) for securing and "unlocking" the voice-interaction device 201, and may then begin using the voice-interaction device 201 to engage in certain user activities via voice-based interaction.

After the voice-interaction device 201 (which may have been provisioned with identifying information in line with the discussion above) is received by the user, the user may set up the voice-interaction device 201 by provisioning it with biometric information. While the examples below describe provisioning the voice-interaction device 201 with fingerprint information, it should be understood that depending on the implementation, the voice-interaction device 201 may be provisioned with other types of biometric information in addition to or instead of fingerprint information, such as retinal information or facial information, among other possibilities.

The process of provisioning the voice-interaction device 201 with fingerprint information in accordance with the present disclosure may take various forms, and in at least some embodiments, may involve at least two stages: (i) the voice-interaction device 201 first determining that a user is requesting to provision the voice-interaction device 201 with a new fingerprint, and (ii) the voice-interaction device 201 then proceeding with provisioning the voice-interaction device 201 with the new fingerprint.

Figure 3:
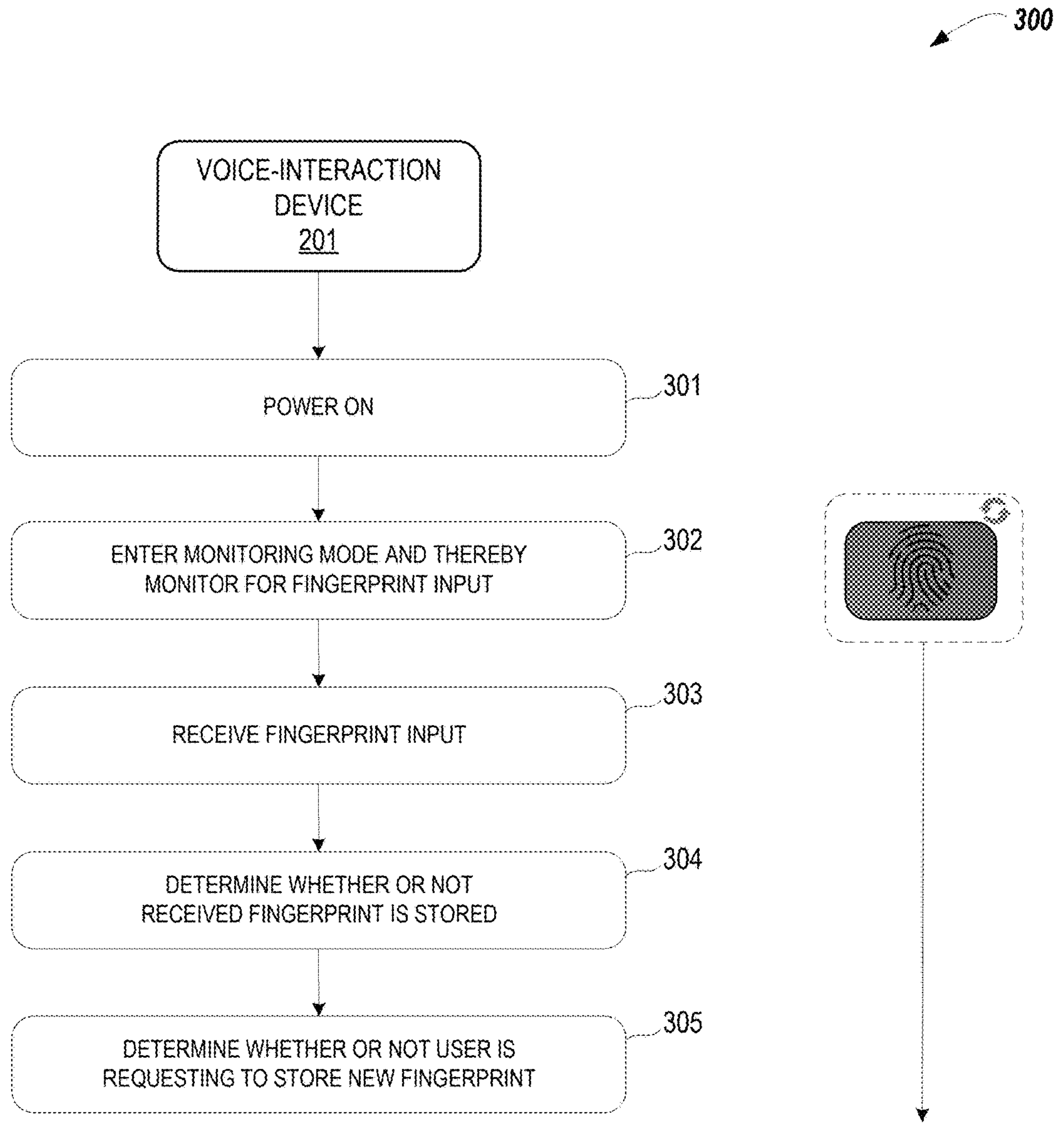
FIG. 3 depicts a flow diagram of one example of functionality that may be carried out in accordance with a first stage of an example process for provisioning the voice-interaction device with biometric input, in accordance with one embodiment of the disclosed technology.

FIG. 3 depicts a flow diagram of one example 300 of functionality that may be carried out by the voice-interaction device 201 in accordance with a first stage of an example process for provisioning the voice-interaction device 201 with a new fingerprint.

The example functionality 300 may begin at 301 with the voice-interaction device 201 powering on. The voice-interaction device 201 may power on in various ways. For instance, as one possibility, the voice-interaction device 201 may comprise a button for turning the voice-interaction device 201 on and/or off, and the voice-interaction device 201 may power on in response to the user selecting the button to power on the voice-interaction device 201. In some instances, the voice-interaction device 201 may need to be connected to a power source before powering on. In such instances, the user may need to connect the voice-interaction device 201 to a power source—for example, by coupling the voice-interaction device 201 to a charger that is plugged in to a power outlet.

At 302, after powering on, the voice-interaction device 201 may begin operating in a first mode which may be referred to herein as a "monitoring" mode or a "monitor" mode. In line with the discussion above, while operating in the monitoring mode, the voice-interaction device 201 may monitor for a biometric input that serves to "unlock" additional functionality of the voice-interaction device 201.

For instance, while operating in the first mode, the voice-interaction device 201 may monitor for a fingerprint input. In one implementation, the voice-interaction device 201 may produce a spoken output indicating instructions for providing a fingerprint input (e.g., via a speaker or a headphone device). The spoken output indicating the instructions for providing the fingerprint input may take various forms. For instance, the spoken output may indicate placement instructions for the fingerprint input, instructions to adjust placement of a fingerprint input, and/or a length of time the fingerprint input is to be provided, among other possibilities. Further, if the voice-interaction device 201 determines that no fingerprint input is being provided, the voice-interaction device 201 may produce a spoken output that prompts the user to provide a fingerprint input. In some instances, the voice-interaction device 201 may monitor for a fingerprint input for a given period of time, and if no fingerprint is detected by the time the given period of time has lapsed, exit the monitoring mode. For example, the voice-interaction device 201 may enter a different mode, such as an idle mode or a standby mode, or the voice-interaction device 201 may power off. In such instances, the voice-interaction device 201 may produce a spoken output (and/or perhaps an audible output such as a chime) indicating that it is exiting the monitoring mode. Other examples are also possible.

Additionally, while operating in the first mode, the voice-interaction device 201 may optionally perform certain functionality related to the connection of an external headphone device that is, or may become, coupled with the voice-interaction device. For instance, in one implementation, the voice-interaction device 201 may determine whether or not a headphone device is physically connected to the voice-interaction device via a headphone interface of the voice-interaction device 201 (e.g., a port for receiving a headphone device connection). In another implementation, the voice-interaction device 201 may determine whether or not a wireless headphone device is in proximity of the voice-interaction device 201 and available for wireless connection (e.g., via a Bluetooth or WIFI connection). Other examples are also possible. In some instances where no headphone device is detected, the voice-interaction device 201 may optionally produce a spoken output prompting the user to connect a headphone device. And in instances where the user opts not to connect a headphone device, then depending the implementation, the voice-interaction device 201 may be configured to either (i) restrict the user's ability to engage in a voice-based interaction session until the user connects a headphone device, (ii) seek a user's permission to use a speaker for spoken output during a particular voice-based interaction session with the user (e.g., via an initial voice-based exchange with the user), or (iii) automatically use a speaker for spoken output (while optionally producing a spoken output indicating that security and/or confidentiality may be reduced as a result of using the voice-interaction device 201 without a headphone device).

At 303, the voice-interaction device 201 may receive a fingerprint input provided at a biometric sensor of the voice-interaction device 201. In turn, at 304 the voice-interaction device 201 may determine whether or not the received fingerprint has been stored at (i.e., provisioned on) the voice-interaction device 201. This determination make take various forms.

For instance, as one possibility, the determination may involve the voice-interaction device 201 first determining whether or not there are any stored fingerprints on the voice-interaction device 201, and then if there are any stored fingerprints, determining whether or not the detected fingerprint matches a stored fingerprint. If the voice-interaction device 201 determines that there are no stored fingerprints or that the detected fingerprint does not otherwise match a stored fingerprint, the voice-interaction device 201 may proceed with determining whether or not the user wishes to proceed with provisioning the voice-interaction device 201 with a new fingerprint in line with the discussion below with reference to 305. Alternatively, if the voice-interaction device 201 determines that the detected fingerprint matches a stored fingerprint, the voice-interaction device 201 may proceed with enabling the user to engage in one or more activities using the voice-interaction device 201, in line with the discussion below with reference to FIG. 5.

At 305, after determining that the detected fingerprint has not previously been stored, the voice-interaction device 201 may determine whether or not the user is requesting to provision the voice-interaction device 201 with a new fingerprint. This determination make take various forms.

For instance, as one possibility, after determining that the detected fingerprint has not previously been stored, the voice-interaction device 201 may produce a spoken output prompting the user to indicate whether or not the user wishes to proceed with provisioning the voice-interaction device 201 with a new fingerprint (e.g., provision the voice-interaction device 201 with the fingerprint currently being provided). For example, the voice-interaction device 201 may produce a spoken output asking, for example, "Would you like to add a fingerprint?" or "To add a fingerprint, say One." In some implementations, the spoken output may also indicate that no fingerprint is currently stored on the voice-interaction device 201. Further yet, in some implementations, the spoken output may indicate that storing a fingerprint is required in order to use the voice-interaction device 201 to engage in one or more activities related to the user's accounts. The spoken output may take other forms as well, including a combination of any of the foregoing examples.

After producing the spoken output prompting the user to confirm whether or not the user wishes to add a fingerprint, the voice-interaction device 201 may monitor for a spoken input.

In turn, the voice-interaction device 201 may receive a spoken input provided by the user. After receiving the spoken input, the voice-interaction device 201 may analyze the spoken input (e.g., using one or more speech processing techniques) to determine whether or not the user is requesting to provision the voice-interaction device 201 with a new fingerprint. For instance, the user may respond to the spoken output by providing a spoken input, such as by speaking "Yes" or "No" (or "One" or "Two"). In this respect, the voice-interaction device 201 may be configured to determine that certain responses (e.g., "Yeah," or "Yes," or "One," etc.) indicate that the user wishes to add a new fingerprint, in which case the voice-interaction device 201 may proceed with storing the new fingerprint in line with the discussion below. On the other hand, the voice-interaction device 201 may be configured to determine that certain other responses (e.g., "No," or "Two," etc.) indicate that the user does not wish to add a new fingerprint, in which case the voice-interaction device 201 may not proceed with storing the new fingerprint. In this respect, the analysis of the spoken input by the voice-interaction device 201 may involve performing speech recognition on the received spoken input, such as by (i) transforming the received spoken input into text and then comparing the text to a predetermined list of terms that are known to represent "Yes" or "No" responses or (ii) using hotword detectors that are each trained to detect a respective term associated with a "Yes" or "No" response, among other possible forms of speech recognition that may be employed by the voice-interaction device 201.

In a preferred embodiment, whether or not the voice-interaction device 201 continues to operate in the monitoring mode (and permits the user to request storing a new fingerprint) may depend on whether or not the user continues to provide the fingerprint input. In this respect, as shown in FIG. 3, after monitoring for and receiving a fingerprint input while operating in the monitoring mode, the voice-interaction device 201 may continuously, or substantially continuously (e.g., every 2 seconds, every 5 seconds, etc.), detect for presence of the fingerprint. If the voice-interaction device 201 determines that the fingerprint is no longer being provided, the voice-interaction device 201 may exit the monitoring mode automatically, or may take some action to determine whether to continue operating in the monitoring mode. For instance, as one possibility, the voice-interaction device 201 may produce a spoken output prompting the user to continue to provide the fingerprint while attempting to use the voice-interaction device 201. The voice-interaction device 201 may then monitor for receipt of the fingerprint for a given period of time. If the user does not provide the fingerprint input within the given period of time, the voice-interaction device 201 may discontinue operating in the monitoring mode and transition to a different mode, such as an idle mode or a standby mode, or may power off.

Figure 4:
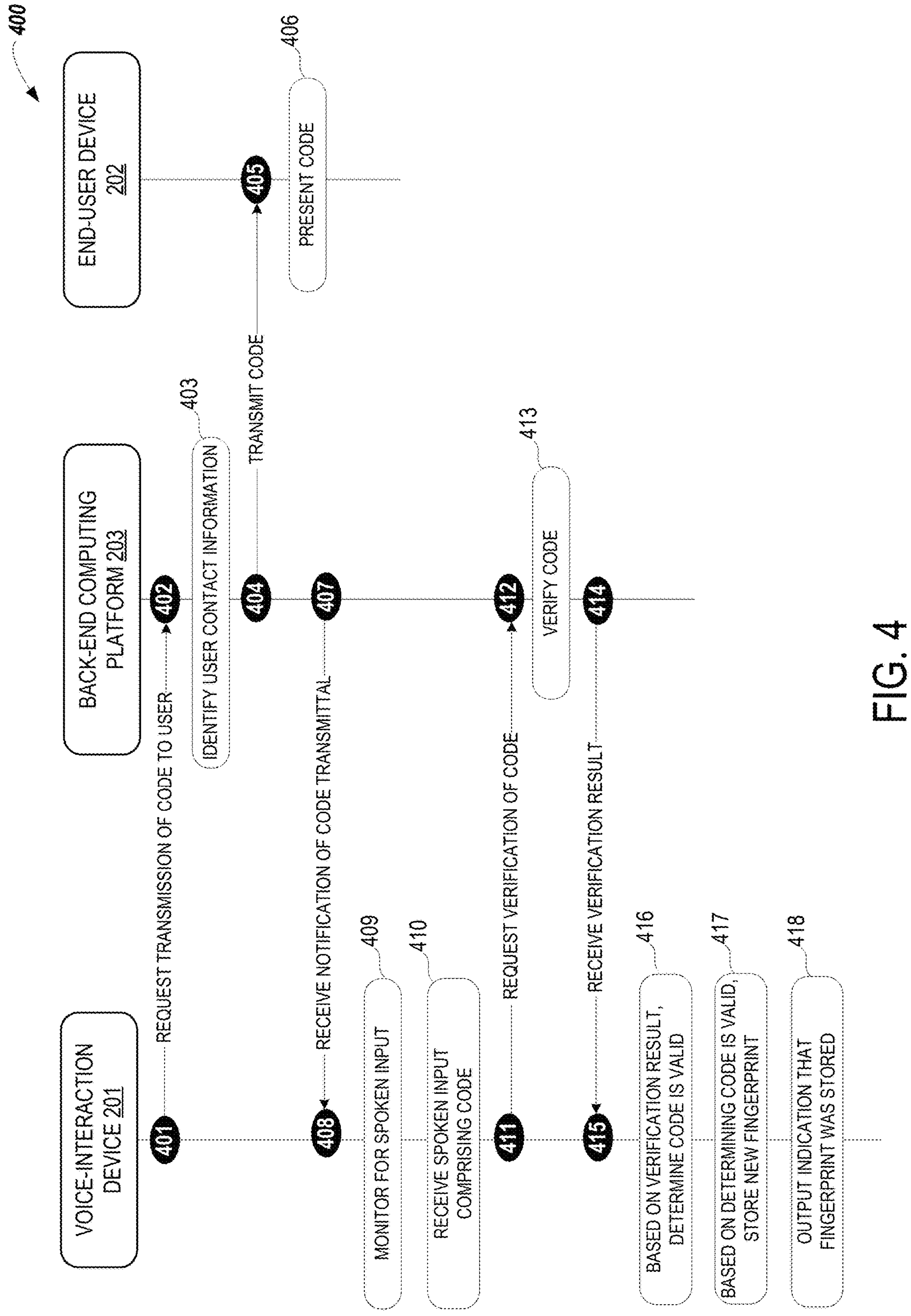
FIG. 4 depicts a flow diagram of one example of functionality that may be carried out in accordance with a second stage of an example process for provisioning the voice-interaction device with biometric input, in accordance with one embodiment of the disclosed technology.

FIG. 4 depicts a flow diagram of one example 400 of functionality that may be carried out in accordance with a second stage of an example process for provisioning the voice-interaction device 201 with a new fingerprint.

The example functionality 400 may begin with the voice-interaction device 201 initiating a verification process to verify that the user who is attempting to provision the voice-interaction device 201 with a new fingerprint is authorized to do so (e.g., the user attempting to add a new fingerprint is the same user to whom the voice-interaction device 201 was issued). Advantageously, this verification process may provide added security that reduces the risk of the voice-interaction device 201 being used to engage in fraudulent activity.

At 401, the voice-interaction device 201 may send a data communication to the back-end computing platform 203 that comprises a request for a user verification code to be sent to the user to whom the voice-interaction device 201 is issued. The data communication may further comprise a portion of the identifying information that was provisioned on the voice-interaction device 201, such as identifying information for the voice-interaction device 201 and/or identifying information for the user. For instance, as one possibility, the data communication may include the MAC address for the voice-interaction device 201, which the back-end computing platform 203 may use as a basis for obtaining information about the user to whom the voice-interaction device 201 was issued. As another possibility, the data communication may include certain information about the user, such as the user's name. Other examples are also possible.

At 402, the back-end computing platform 203 may receive the data communication from the voice-interaction device 201.

At 403, based on the identifying information included in the data communication, the back-end computing platform 203 may identify contact information for the user to whom the voice-interaction device 201 was issued. For instance, in line with the discussion above, the back-end computing platform 203 may access a stored data record that associates identifying information for the voice-interaction device 201 with identifying information for the user to whom the voice-interaction device 201 was issued, which may include or be associated with contact information for the user, such as an email address or a mobile phone number. In some instances, the back-end computing platform 203 may also access information about user contact settings that may indicate a preferred method of contact. In such instances, the back-end computing platform 203 may use the preferred method of contact to identify which particular type of contact information to identify. In other instances, the back-end computing platform 203 may be configured to identify the contact information according to a default preference, such as a phone number that is to be used for purposes of sending text-based communications (e.g., SMS (Short Messaging Service) messages, MMS (Multimedia Messaging Service) messages, etc.) to the user. The function of identifying contact information for the user to whom the voice-interaction device 201 was issued may take other forms as well.

At 404, after identifying the contact information, the back-end computing platform 203 may cause a data communication comprising a user verification code to be transmitted the end-user device 202 associated with the user. The user verification code may take any of various forms. For example, as one possibility, the user verification code may be a code that is valid for a single use, such a one-time password ("OTP") comprising a numerical and/or alphanumerical string. Further, the user verification code may be set to expire after a given period of time has lapsed. Other examples are also possible.

Further, the data communication comprising the user verification code may be transmitted to the end-user device 202 via one or more methods, such as via a text message (e.g., SMS), a notification, or an email, among other possibilities. For instance, as one possibility, the back-end computing platform 203 may cause the user verification code to be transmitted via a text message that is sent to the end-user device 202 and accessible to the user via a text application running on the end-user device 202. As another possibility, the back-end computing platform 203 may cause the user verification code to be transmitted via an email that is sent to an email account configured on the end-user device 202 and is accessible to the user via an email application on the end-user device 202. As yet another possibility, the back-end computing platform 203 may cause the user verification code to be transmitted via an in-app push notification that is accessible to the user via a software application (e.g., a software application provided by the business organization that issued the voice-interaction device 201 to the user) on the end-user device 202. The user verification code may be transmitted to the end-user device 202 in other manners as well.

Further yet, the back-end computing platform 203 may store the user verification code that is transmitted to the end-user device 202 for a period of time (e.g., for the given period of time before which the user verification code is set to expire) that enables the back-end computing platform to verify the user verification code as will be discussed below with reference to 411-415.

At 405, the end-user device 202 may receive the data communication comprising the user verification code. In turn, at 406, the end-user device 202 may present the user verification code via a user interface of the end-user device 202. For instance, as one possibility, the end-user device 202 may output an audio representation of the user verification code. As another possibility, the end-user device 202 may display a visual representation of the user verification code. The end-user device 202 may present the user verification code in other ways as well.

At 407, after causing the user verification code to be transmitted to the end-user device 202, the back-end computing platform 203 may transmit a data communication to the voice-interaction device 201 indicating that the user verification code was transmitted to the user.

At 408, the voice-interaction device 201 may receive the data communication indicating that the user verification code was transmitted to the user. Based on receiving the data communication, at 409, the voice-interaction device 201 may begin monitoring for spoken input that may comprise the user verification code. Additionally, after receiving the data communication at 408, the voice-interaction device 201 may also optionally produce a spoken output that indicates that the user verification code has been sent to the user and/or prompts the user to provide the user verification code.

At 410, while monitoring for spoken input, the voice-interaction device 201 may receive a spoken input comprising the user verification code. In turn, the voice-interaction device 201 may initiate a verification process for the user verification code—although before doing so, the voice-interaction device 201 may optionally confirm that it understood the user verification code correctly. This functionality for confirming that the voice-interaction device 201 understood the user verification code correctly may take various forms.

As one possibility, the voice-interaction device 201 may use one or more speech processing techniques to generate a text representation of the user verification code provided by the user and then produce a spoken output that comprises (i) a reproduction of the user verification code provided by the user based on the text representation and (ii) a prompt for the user to confirm whether or not the reproduction of the user verification code is correct (i.e., whether or not the reproduction of the user verification code matches the user verification code provided by the user). If the voice-interaction device 201 receives a spoken input indicating that the reproduction of the user verification code is correct, the voice-interaction device 201 may proceed to verify the user verification code spoken by the user with the back-end computing platform 203, as described below. On the other hand, if the voice-interaction device 201 receives a spoken input indicating that the reproduction of the user verification code is incorrect, the voice-interaction device 201 may produce a spoken output prompting the user to re-provide the user verification code and/or repeat one or more of the operations at 401-410 as needed. For instance, if the voice-interaction device 201 determines that a threshold period of time has lapsed since requesting transmission of a user verification code at 401, the voice-interaction device 201 may transmit a data communication to the back-end computing platform 203 comprising a request for a new user verification code to be sent to the user, among other possible actions that may be taken by the voice-interaction device 201 if the user verification code cannot be confirmed.

In at least some scenarios, the voice-interaction device 201 may then initiate a verification process for the user verification code received from the user, which may take various forms. One possible implementation of a verification process is depicted in FIG. 4, which involves functionality carried out by both the voice-interaction device 201 and the back-end computing platform 203.

As shown in FIG. 4, at 411, the voice-interaction device 201 may generate and transmit a data communication to the back-end computing platform 203 comprising a request to verify the user verification code, which may include a representation of the user verification code that was received from the user as spoken input. In this respect, the representation of the user verification code may take various forms. For instance, as one example, the representation may comprise a textual representation of the spoken input comprising the user verification code, which the voice-interaction device 201 may generate by using one or more speech processing techniques to convert the spoken input comprising the user verification code to text (among other possibilities). As another example, the representation may comprise a digital audio representation of the spoken input comprising the user verification code, which the voice-interaction device 201 may generate by capturing a recording of the spoke input and converting it into a digital form (among other possibilities). Other examples are also possible.

At 412, the back-end computing platform may receive the data communication comprising the request to verify the user verification code. Based on receiving the data communication, at 413, the back-end computing platform may perform certain functionality for verifying the user verification code. For instance, the back-end computing platform 203 may use the received representation to determine the user verification code that was spoken by the user (e.g., by extracting a textual representation or converting a digital audio representation to text) and then compare the user verification code spoken by the user against the user verification code that was generated for the user in order to determine a verification result. For instance, if the user verification code spoken by the user matches the user verification code generated for the user, the back-end computing platform 203 may determine that the verification result is a successful verification (i.e., the spoken code is valid). On the other hand, if the user verification code spoken by the user does not match the user verification code generated for the user, the back-end computing platform 203 may determine that the verification result is an unsuccessful or failed verification (i.e., the spoken code is not valid). At 414, the back-end computing platform 203 may then transmit a data communication indicating the verification result back to the voice-interaction device 201.

At 415, the voice-interaction device 201 may receive the data communication indicating the verification result. If the verification result indicates that the user verification code spoken by the user is valid, the voice-interaction device 201 may proceed with storing the new fingerprint. On the other hand, if the verification result indicates that the user verification code spoken by the user is not valid, the voice-interaction device 201 may produce a spoken output indicating as such and/or repeat one or more of the functions described above with respect to 401-415.

Other implementations of the verification process for the user verification code are possible as well. For instance, as one alternate implementation, the back-end computing platform 203 may provide the voice-interaction device 201 with a representation (e.g., a text representation) of the user verification code that was generated for the user, either in response to the user verification code being generated or in response to a request for verification by the voice-interaction device 201. In practice, this may involve the back-end computing platform 203 transmitting a data communication comprising the representation of the user verification code to the voice-interaction device 201. The voice-interaction device 201 may then compare the user verification code spoken by the user against the user verification code received from the back-end computing platform 203 in order to determine a verification result. If the user verification code spoken by the user matches the user verification code received from the back-end computing platform 203, the voice-interaction device 201 may determine that the verification result is a successful verification (i.e., the spoken code is valid). On the other hand, if the user verification code spoken by the user does not match the user verification code received from the back-end computing platform 203, the voice-interaction device 201 may determine that the verification result is an unsuccessful or failed verification (i.e., the spoken code is not valid), and may produce a spoken output indicating as such and/or repeat one or more of the functions described above with respect to 401-415.

The verification process for the user verification code may take other forms as well.

At 416, based on the verification process that is carried out for the user verification code, the voice-interaction device 201 may determine that the user verification code is valid (i.e., the user verification code was successfully verified).

At 417, after determining that the user verification code is valid, the voice-interaction device 201 may store the new fingerprint. The function of storing the new fingerprint may involve the voice-interaction device 201 capturing the fingerprint (e.g., the fingerprint input being provided by the user via the fingerprint sensor during the course of the provisioning process) and storing a representation of the fingerprint. The stored representation of the fingerprint may take any of various forms, one example of which may be a biometric template.

In some instances, the voice-interaction device 201 may optionally output guidance for providing a legible fingerprint input. For example, if the fingerprint input is not legible (e.g., if the user's finger is not situated appropriately at the fingerprint sensor, or if the user removes their finger before capture and storage of the fingerprint is complete, etc.), the voice-interaction device 201 may produce one or more spoken outputs indicating instructions for correctly providing the fingerprint input. As another example, the voice-interaction device 201 may intermittently produce a spoken output instructing the user to continue providing the fingerprint input.

At 418, after storing the representation of the fingerprint, the voice-interaction device 201 may produce a spoken output indicating that the user's fingerprint has been successfully stored.

In some implementations, after storing the representation of the fingerprint, the voice-interaction device 201 may also optionally determine whether or not the user wishes to store an additional fingerprint. For instance, the voice-interaction device 201 may produce a spoken output asking the user to indicate whether or not the user wishes to store an additional fingerprint, and the voice-interaction device 201 may then receive a spoken input comprising the user's response (e.g., "Yes" or "No" or other spoken responses corresponding thereto), based on which the voice-interaction device 201 may determine whether or not the user wishes to store an additional fingerprint. If the voice-interaction device 201 determines that the user wishes to store an additional fingerprint, it may proceed to capture and store one or more additional fingerprints in line with the discussion above.

After the voice-interaction device 201 has been set up and provisioned with at least one user fingerprint, the fingerprint may be used for authenticating the user to engage in certain voice-based interactions with the voice-interaction device 201.

For instance, as one possibility, a stored fingerprint may be used for authenticating the user to engage in certain activities. For instance, in line with the discussion above, a user may have one or more accounts with a business organization, such as a financial account or an e-commerce account, among other examples, and the activities that are available to the user to engage in using the voice-interaction device 201 may take various forms depending on the type of account. For instance, some example activities that may be available for a user to engage in using the voice-interaction device 201 with respect to the user's one or more financial accounts may include checking an account balance for one or more of the user's financial accounts, checking a payment due date for one or more of the user's financial accounts, making a payment for one or more of the user's financial accounts, or transferring funds between the user's financial accounts, among other possible examples.

As another possibility, a stored fingerprint may be used for authenticating the user to manage device settings for the voice-interaction device 201. Such device settings may take various forms. As one example, the device settings may include audio output settings, such as settings that enable the user to adjust a volume level of spoken output produced by the voice-interaction device 201, among other possibilities. As another example, the device settings may include audio input settings, such as settings that enable the user to couple the voice-interaction device 201 with a wireless headphone device (or forego checking for a connection to a headphone device for example, if the user plans to use the voice-interaction device 201 in a private environment and does not wish to be prompted to connect a headphone device), among other possibilities. As yet another example, the device settings may include fingerprint-related settings, such as settings that enable the user to delete a stored fingerprint or initiate the process for adding a new fingerprint, among other possibilities.

A stored fingerprint may be used for authenticating the user to engage in other types of voice-based interaction with the voice-interaction device 201 as well.

Figure 5:
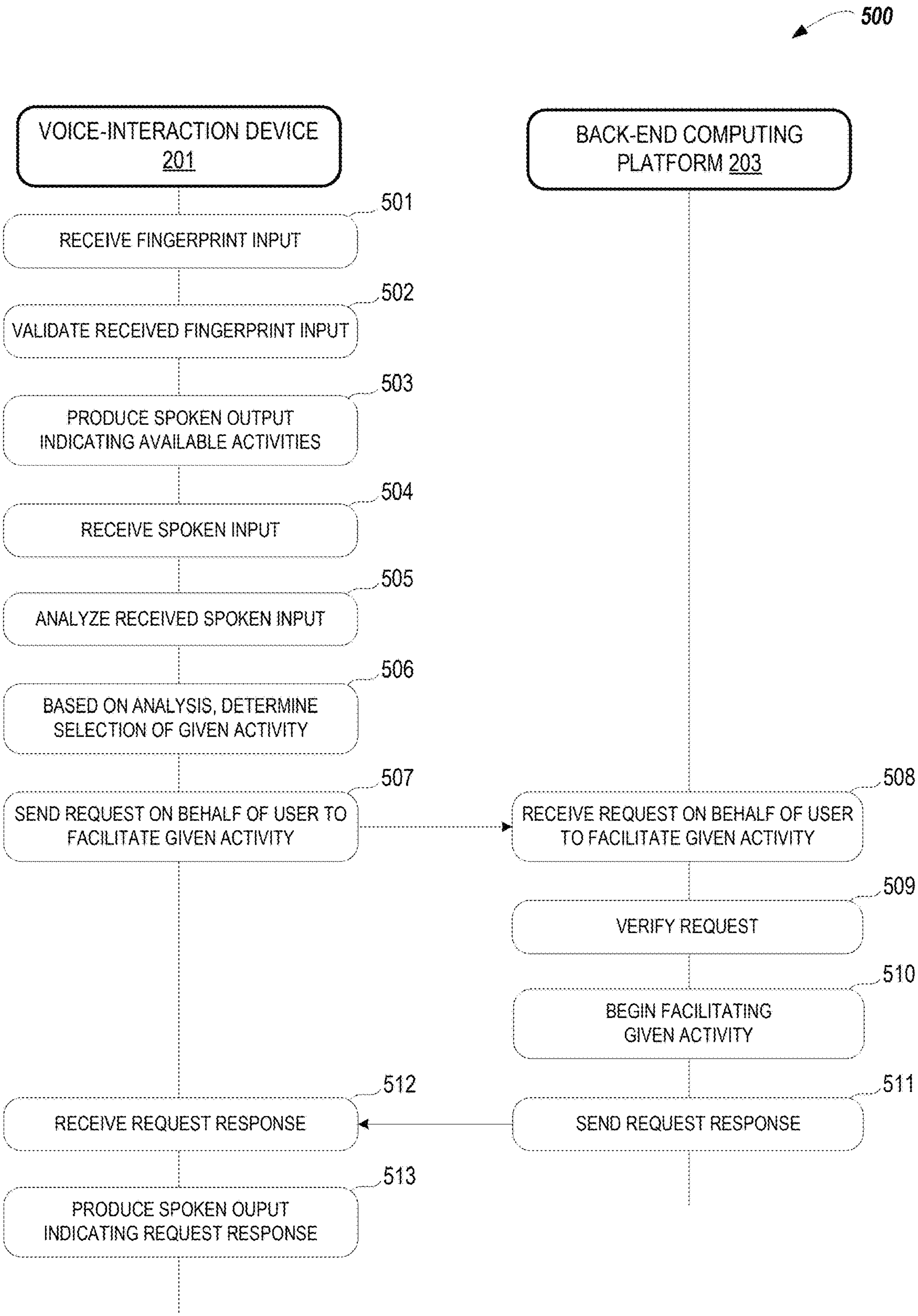
FIG. 5 depicts a flow diagram of one example of functionality that may be carried out in order to enable a user to engage in activities via voice-based interaction with a voice-interaction device, in accordance with one embodiment of the disclosed technology.

FIG. 5 depicts a flow diagram of one example 500 of functionality that may be carried out in order to enable a user to engage in activities via voice-based interaction with the voice-interaction device 201, in accordance with one embodiment of the disclosed technology. In practice, the example functionality 500 may be initiated after the voice-interaction device 201 has been provisioned with at least one fingerprint of the user, and may begin while the voice-interaction device 201 is powered on and operating in a monitoring mode in which it is monitoring for a fingerprint input, in line with the discussion above.

At 501, the voice-interaction device 201 may receive a fingerprint input. After receiving the fingerprint input, the voice-interaction device 201 may then make an initial determination of whether or not the voice-interaction device 201 has been provisioned with at least one fingerprint to use for authenticating the user, and if so, the voice-interaction device 201 may proceed with validating the fingerprint input in order to determine whether or not the user is authenticated to engage in activities via voice-based interaction with the voice-interaction device 201.

At 502, the voice-interaction device 201 may validate the received fingerprint input. The functionality related to validating the received fingerprint input may take various forms. For instance, as one possibility, validating the received fingerprint input may involve (i) capturing the received fingerprint input, (ii) generating a representation of the received fingerprint input (e.g., a biometric template for the fingerprint), and (iii) comparing the representation of the received fingerprint input against stored fingerprint representation(s) to determine if the received fingerprint input matches any stored fingerprint. If the voice-interaction device 201 determines that the received fingerprint input matches a stored fingerprint, the voice-interaction device 201 may determine that the received fingerprint input is valid and that the user providing the fingerprint is authenticated to engage in available activities. On the other hand, if the voice-interaction device 201 determines that the received fingerprint input does not match a stored fingerprint, the voice-interaction device 201 may determine that the received fingerprint input is not valid and may proceed to perform some other action(s)—such as notifying the user that the fingerprint input is not valid, determining if the user wishes to add a new fingerprint, and/or adding a new fingerprint, in line with the discussion above.

If the voice-interaction device 201 determines that the received fingerprint input is valid and that the user providing the fingerprint is authenticated to perform the available account-related activities, the voice-interaction device 201 may transition from operating in the monitoring mode to operating in a second mode—referred to herein as an "activity" mode—during which the voice-interaction device 201 permits the user to engage in available activities via voice-based interaction with the voice-interaction device 201.

In a preferred embodiment, whether or not the voice-interaction device 201 continues to operate in the activity mode (and permits the user to engage in the available activities via voice-based interaction) may depend on whether or not the user continues to provide the fingerprint input. In this respect, while operating in the activity mode, the voice-interaction device 201 may continuously, or substantially continuously (e.g., every 2 seconds, every 5 seconds, etc.), detect for presence of the fingerprint. If the voice-interaction device 201 determines that the fingerprint is no longer being provided, the voice-interaction device 201 may exit the activity mode automatically, or may take some action to determine whether to continue operating in the activity mode. For instance, as one possibility, the voice-interaction device 201 may produce a spoken output prompting the user to continue to provide the fingerprint while attempting to use the voice-interaction device 201. The voice-interaction device 201 may then monitor for receipt of the fingerprint for a given period of time. If the user does not provide the fingerprint input within the given period of time, the voice-interaction device 201 may discontinue operating in the activity mode and transition back to the monitoring mode. Advantageously, conditioning the voice-interaction device's operation in the activity mode on the presence of the user's fingerprint input as disclosed herein provides additional security for the user against exposure to unauthorized use of the voice-interaction device 201. However, in other embodiments, it is possible that voice-interaction device 201 could be configured to enter into the activity mode in response to validation of the user's fingerprint input and then continue operating in that activity mode for some period of time thereafter regardless of whether or not the user continues to provide the fingerprint input.

At 503, if the received fingerprint input is validated, the voice-interaction device 201 may produce, or begin to produce, a spoken output that provides an indication of one or more available activities that the user may engage in using the voice-interaction device 201 (as discussed above). Further, the spoken output may indicate, for each respective available activity, one or more corresponding responses that the user can speak to indicate the user's selection of the respective activity.

Producing the spoken output comprising the available activities may take various forms. For instance, in one implementation, the voice-interaction device 201 may begin to produce the spoken input and cycle through the available activities and corresponding user responses while monitoring for spoken input. For example, the spoken output may indicate a first activity and corresponding responses that takes the form of "To check your account balance, say 'check balance' or 'one,'" a second activity and corresponding responses that takes the form of "To make a payment, say 'make payment' or 'two,'" and so on, among other possibilities. As one possibility, the voice-interaction device 201 may speak out the available activities and corresponding responses until a spoken input comprising a user response is detected, or if no spoken input comprising a user response is detected, the voice-interaction device 201 may continue to speak out and repeat the available activities and corresponding responses for a given period of time (e.g., until one or more iterations of outputting the available activities have been completed). If no spoken input is detected during the given period of time, the voice-interaction device 201 may prompt the user to confirm whether or not the user wishes to continue, otherwise, the voice-interaction device 201 may return to a monitoring mode, an idle mode, or power off, among other possibilities.

The voice-interaction device 201 may produce the spoken output that provides the indication of the available activities in other ways as well. For instance, in another implementation, the voice-interaction device 201 may produce a series of spoken outputs, wherein each spoken output indicates a respective available activity and prompts the user to confirm whether or not the user wishes to perform the respective available activity. Other examples are also possible.

After producing, or beginning to produce, the spoken output that provides the indication of the available activities, at 504, the voice-interaction device 201 may receive a spoken input that may or may not comprise a selection of an account-related activity option. In turn, at 505, the voice-interaction device 201 may analyze the spoken input to determine whether the spoken input comprises a selection of an account-related activity option. The function of analyzing the spoken input to determine whether or not the spoken input comprises a selection of an account-related activity option may take various forms, and in practice, may involve the use of one or more speech processing techniques.

In one implementation, the analysis of the spoken input by the voice-interaction device 201 may involve (i) using a speech processing technique (e.g., speech-to-text processing) to generate a text representation of the spoken input and then (ii) comparing the text representation of the spoken input to a predefined list of keywords that each constitutes a corresponding response for a respective available activity (e.g., "one" or "check balance" for a first available activity, "two" or "make payment" for a second available activity, etc.). If the text representation matches a given keyword, the voice-interaction device 201 may determine that the user has selected the respective available activity corresponding to the given keyword. For example, the user may provide a spoken input comprising the words "check balance." The voice-interaction device 201 may perform speech-to-text processing on the spoken input to obtain a text representation constituting the phrase "check balance." The voice-interaction device 201 may then compare the phrase "check balance" against a listing that maps keywords to available activities. Based on the comparison, the voice-interaction device 201 may determine that the phrase "check balance" matches a keyword "check balance" that in turn corresponds to an available activity of checking a balance of a financial account associated with the user.

In another implementation, the voice-interaction device 201 may have one or more hotword detectors for identifying respective hotwords corresponding to each available activity. After receiving the spoken input, the voice-interaction device 201 may use the hotword detectors to determine whether or not the spoken input indicates selection of an available activity.

In yet another implementation, the voice-interaction device 201 may perform speech-to-text processing to obtain a text representation of the spoken input and then apply one or more natural language processing (NLP) techniques to the text representation in order to determine an intent of the spoken input. Based on the intent, the voice-interaction device 201 may determine whether or not the spoken input indicates selection of an available activity.

Further yet, in another implementation, the voice-interaction device 201 may use a speech processing technique (e.g., speech-to-text processing) to generate a text representation of the spoken input and may then transmit a data communication to the back-end computing platform 203 comprising a request to determine whether or not the textual representation of the spoken input indicates selection of an available activity. In turn, the back-end computing platform 203 may determine whether or not the textual representation of the spoken input indicates a selection of an available activity on (e.g., using keyword matching or NLP) and then transmit a data communication back to the voice-interaction device 201 that indicates a result of the determination.

In some implementations, prior to performing the types of analyses described above, the voice-interaction device 201 could also perform an initial check to confirm that the audio input detected by the voice-interaction device 201 actually comprises spoken input as contrasted with some other form of audible input, such as background sound that may have been received by the voice-interaction device 201. The voice-interaction device 201 may employ any of various techniques for performing this initial check, including but not limited to voice activity detection (VAD) techniques.

The voice-interaction device 201 may analyze the spoken input to determine whether the spoken input comprises a selection of an available activity in other ways as well.

In some instances, after performing an analysis of the spoken input provided by the user, the voice-interaction device 201 may also determine that follow-up interaction with the user is necessary. In such instances, the voice-interaction device 201 may prompt the user for additional information—such as additional information that enables the voice—interaction device 201 to determine which activity has been selected or additional information that is necessary in order to carry out the selected activity. For instance, determining that the user has selected the activity to check an account balance may cause the voice-interaction device 201 to prompt the user for an identification of a given account for which to check the account balance.

Based on the analysis of the spoken input performed at 505, at 506 the voice-interaction device 201 may determine that the spoken input indicates a selection of a given activity. In turn, at 507, the voice-interaction device 201 may transmit a data communication to the back-end computing platform 203 (e.g., via a secure communication protocol such as VOIP) comprising a request to carry out back-end functionality in order to facilitate the given activity selected by the user. The request may include (i) an indication that the voice-interaction device 201 has successfully authenticated the user, (ii) an indication of the given activity selected by the user, and perhaps also (iii) additional information received from the user (e.g., in follow-up interactions as described above) that may facilitate the given activity.

The indication that the voice-interaction device 201 has successfully authenticated the user may take various forms. For instance, as one possibility, the indication may comprise a data communication confirming that the voice-interaction device 201 has successfully validated a fingerprint provided by the user, thereby authenticating the user, and determined that the user is authorized to engage in the given activity being requested. Further, the indication may be encrypted using a randomly generated, unique code that indicates a particular decrypting algorithm, based on which the back-end computing platform 203 may decrypt the indication to obtain the confirmation that the user is authorized to engage in the given activity. The indication that the voice-interaction device 201 has successfully authenticated the user may take other forms as well.

Further, the indication of the given activity selected by the user may take various forms. For instance, as one possibility, the indication may comprise a numeric or alphameric code that represents the given activity. As another possibility, the indication may comprise a textual descriptor of the given activity. The indication of the given activity selected by the user may take other forms as well.

At 508, the back-end computing platform 203 may receive the request to carry out back-end functionality in order to facilitate the given activity selected by the user. In turn, at 509, the back-end computing platform 203 may verify the request, which may involve decrypting the indication that the voice-interaction device 201 has successfully authenticated the user to obtain the confirmation that the user is authorized to engage in the given activity being requested.

At 510, the back-end computing platform 203 may then begin performing one or more functions in order to facilitate the given activity selected by the user. For instance, as one example, if the given activity selected by the user comprises checking a balance of a given user account, the back-end computing platform 203 may access the given user account and thereby determine an account balance for the given user account. As another example, if the given activity selected by the user comprises making a payment of a given amount for a given user account, the back-end computing platform 203 may access the given user account and cause payment of the given amount to be made for the given user account. Other examples are also possible.

In some instances, it is possible that after beginning to perform the one or more functions to facilitate the given activity selected by the user, the back-end computing platform 203 may determine that the given activity cannot be completed. For instance, as one example, the back-end computing platform 203 may determine that a payment of a given amount for a given user account cannot be completed due to insufficient funds. In such instances, the back-end computing platform 203 may not be able to facilitate the given account-related activity.

At 511, the back-end computing platform 203 may transmit a data communication to the voice-interaction device 201 (e.g., via a secure communication protocol such as VoIP) comprising a response to the request to facilitate the given activity. The response may indicate whether or not the given activity has been or can be completed. In some instances where the given activity can be completed, the response may additionally include information that is to be provided to the user by the voice-interaction device 201 in order to complete the given activity. For example, if the given activity was to check a balance of a given user account, the response may indicate the account balance for output to the user. As another example, if the given activity was to make a payment of a given amount for a given user account, the response may indicate a confirmation that the payment was scheduled and a date for which the payment is scheduled. Other examples are also possible.

At 512, the voice-interaction device 201 may receive the data communication comprising the response to the request to facilitate the given activity. Based on the response, at 513, the voice-interaction device 201 may produce a spoken output. The spoken output may take various forms depending on (i) the given activity selected by the user and/or (ii) whether or not the given activity has been or can be completed. For example, if the given activity was to check a balance of a given user account, the spoken output may indicate the account balance of the given user account. As another example, if the given activity was to make a payment of a given amount for a given user account, the spoken input may indicate that the payment was scheduled on a given date. As yet another example, if the given activity could not be completed for some reason, the spoken input may indicate that the given activity was unable to be completed. In some instances, the spoken input may further indicate why the given activity was unable to be completed and/or one or more actions the user may take in order for the given activity to be completed at a later time. For instance, if the given activity was to transfer a given amount of funds from a first account to a second account, and the response indicated that the given activity could not be completed due to the first account comprising insufficient funds, the spoken input may indicate that the requested transfer could not be completed due to insufficient funds and that deposit of additional funds to the first account is required before the given activity can be completed. Other examples are also possible.

As previously mentioned, the voice-interaction device 201 may monitor for provision of the fingerprint throughout the process of facilitating an activity as described above. In line with the discussion above, if the voice-interaction device 201 determines at any point during the process that the fingerprint is no longer being provided, the voice-interaction device 201 may pause and/or discontinue facilitating the activity.

While the example embodiment of FIG. 5 is described in terms of the back-end computing platform 203 carrying out back-end functionality in order to facilitate a requested activity, in other embodiments, it is possible that the voice-interaction device 201 could additionally or alternatively perform certain device-side functionality in order to facilitate a requested activity (e.g., an activity that can be performed without obtaining information from or otherwise invoking the functionality of the back-end computing platform 203).

Figure 6:
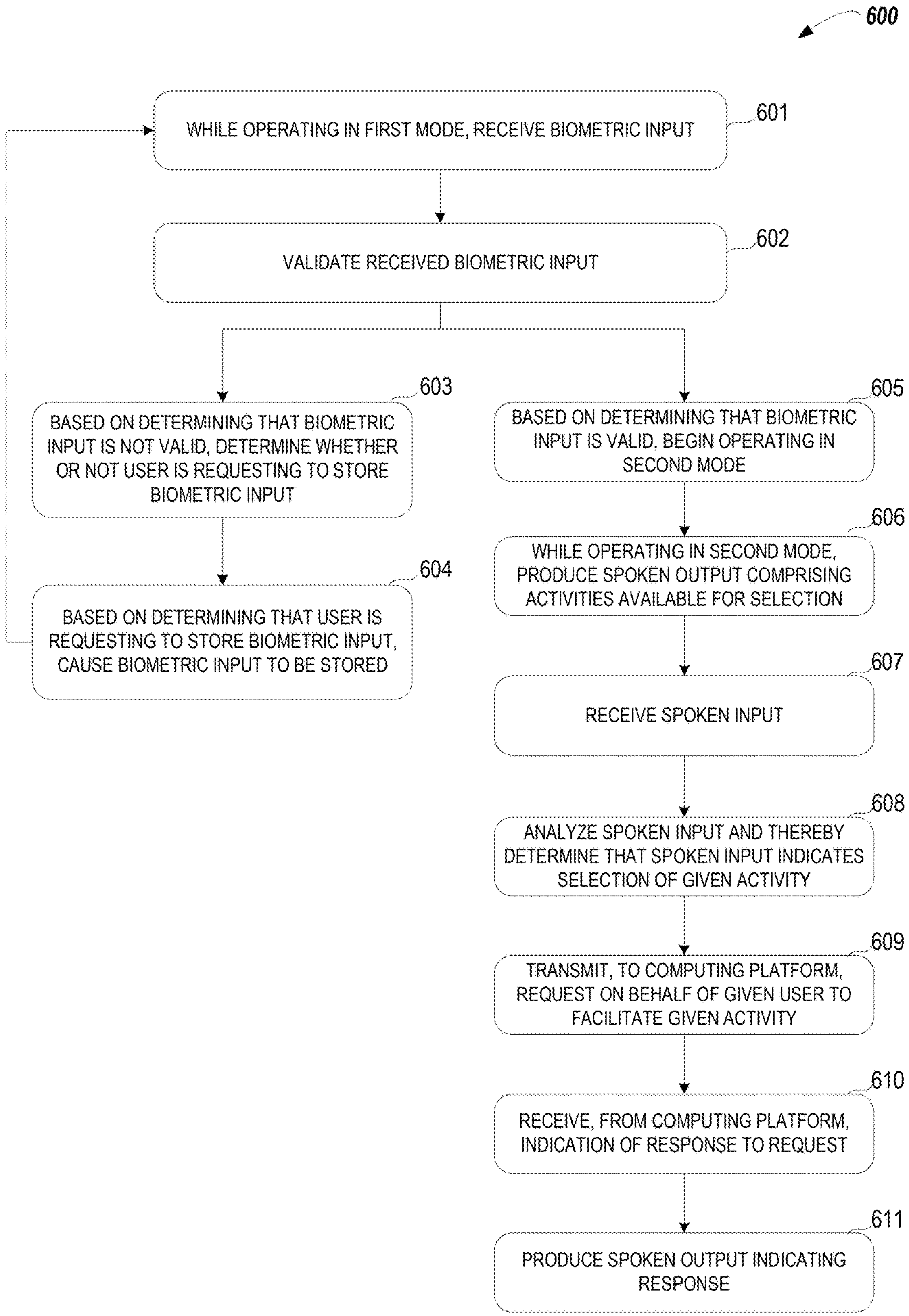
FIG. 6 depicts one example of functionality that may be carried out by a voice-interaction device in order to enable a user to engage in activities via voice-based interaction with the voice-interaction device, in accordance with one embodiment of the disclosed technology.

Turning now to FIG. 6, a flow diagram of example functionality 600 that may be carried out by a voice-interaction device in accordance with one embodiment of the disclosed technology is shown. The voice-interaction device may be issued to a user that has an account with a business organization. In practice, the example functionality 600 may be carried out after the user has powered on the voice-interaction device and the voice-interaction device has begun operating in a first mode in which the voice-interaction device is operable to perform functions related to monitoring for a biometric input that serves to unlock additional functionality, as described above. In line with the discussion above, the voice-interaction device may optionally produce a spoken output indicating instructions for providing a biometric input. Additionally, the voice-interaction device may optionally perform certain functionality related to the connection of an external headphone device that is, or may become, coupled with the voice-interaction device.

At 601, while operating in the first mode, the voice-interaction device may receive a biometric input via a biometric sensor of the voice-interaction device. The biometric input may take various forms as described above, including a fingerprint input, a retinal scan, or a facial scan, among other possibilities.

At 602, the voice-interaction device may validate the received biometric input in line with the discussion above in order to determine whether or not the received biometric input is valid—i.e., whether or not the received biometric input matches a stored biometric input. As described above, validating the received biometric input may involve (i) capturing the biometric fingerprint input, (ii) generating a representation of the received biometric input, and (iii) comparing the representation of the received biometric input against any stored biometric representation(s) to determine if the received biometric input matches any stored biometric representations. If the voice-interaction device determines that the received biometric input matches a stored biometric representation, the voice-interaction device may determine that the received biometric input is valid and that the user providing the fingerprint is authorized to use the voice-interaction device to engage in available activities, in which case the voice-interaction device may proceed to 605.

However, if the voice-interaction device determines that the received biometric input does not match a stored biometric representation (or if no stored biometric representations exist), the voice-interaction device may determine that the received biometric input is not valid and that the user providing the fingerprint is not (yet) authorized to use the voice-interaction device to engage in available activities, which case the voice-interaction device may proceed to 603, where the voice-interaction device may determine whether or not the user is requesting to store the received biometric input. The voice-interaction device may determine whether or not the user is requesting to store the received biometric input in line with the discussion above with reference to 305 of FIG. 3. At 604, the voice-interaction device may determine that the user is requesting to store the received biometric input. In line with the discussion above with reference to FIG. 4, based on determining that the user is requesting to store the received biometric input, the voice-interaction device may capture and store a representation of the received biometric input.

At 605, based on determining that the biometric input is valid, the voice-interaction device may transition from operating in the first mode to operating in a second mode during which the voice-interaction device permits the user to engage in certain activities via voice-based interaction, in line with the discussion above.

At 606, while operating in the second mode, the voice-interaction device may produce, or begin to produce, a spoken output comprising (i) an indication of one or more activities that are available to the user for selection and (ii) for each respective activity that is available to the user, an indication of one or more corresponding responses that the user can speak to indicate selection of the respective activity. In line with the discussion above, while producing the spoken output, the voice-interaction device may concurrently monitor for spoken input.

At 607, the voice-interaction device may receive a spoken input that may or may not indicate selection of an available activity. In line with the discussion above, after receiving the spoken input, at 608, the voice-interaction device may then analyze the spoken input in order to determine whether the spoken input indicates selection of an available activity, which may involve (i) using a speech processing technique (e.g., speech-to-text processing) to generate a text representation of the spoken input and then (ii) comparing the text representation of the spoken input to a predefined list of keywords that each constitutes a corresponding response for a respective activity, among other possibilities.

At 609, the voice-interaction device may transmit, to a back-end computing platform operated by the business organization, a data communication comprising a request to carry out back-end functionality in order to facilitate the given activity selected by the user, which may include at least (i) an indication that the voice-interaction device has successfully authenticated the user and (ii) an indication of the given activity selected by the user. In line with the discussion above, the response may additionally include identifying information for the voice-interaction device, which the back-end computing platform may use as a basis for obtaining information about the user (e.g., account information, contact information, etc.).

At 610, the voice-interaction device may receive a data communication comprising a response to the request. In line with the discussion above, the response may indicate whether or not the given activity has been or can be completed, perhaps along with information that is to be output to the user in order to complete the activity.

At 611, the voice-interaction device may produce a spoken output based on the response. In line with the discussion above, the spoken output may take various forms depending on the given activity requested by the user and/or whether or not the given activity has been or can be completed.

Figure 7:
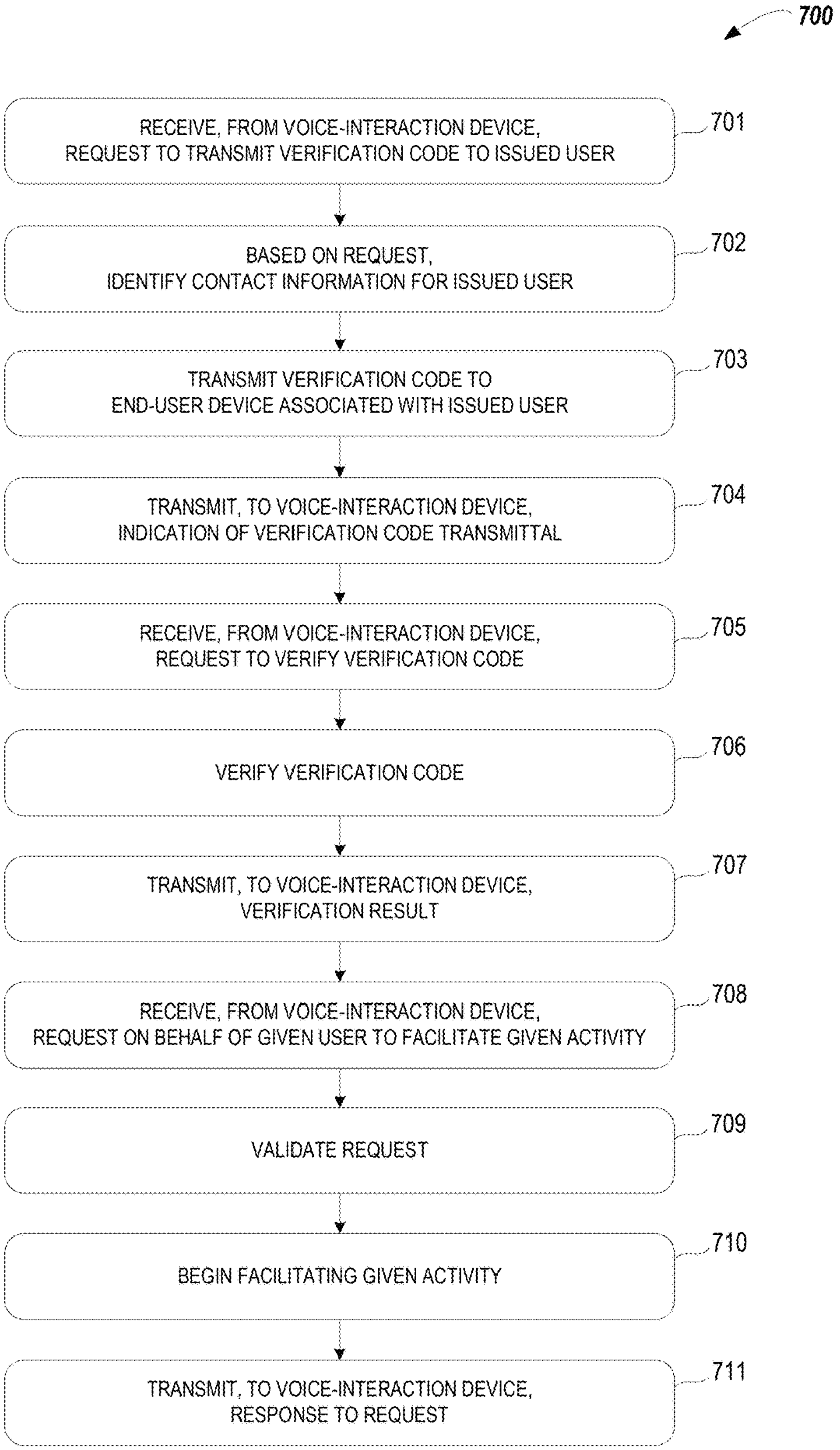
FIG. 7 depicts one example of functionality that may be carried out by a back-end computing platform in order to facilitate one or more activities selected by a user via voice-based interaction with a voice-interaction device, in accordance with one embodiment of the disclosed technology.

Turning next to FIG. 7, a flow diagram of example functionality 700 that may be carried out by a back-end computing platform in accordance with one embodiment of the disclosed technology is shown. In practice, the back-end computing platform may be operated by a business organization that has issued a voice-interaction device to a user having one or more accounts with the business organization.

The example functionality 700 may begin at 701, with the back-end computing platform receiving, from a voice-interaction device, a data communication comprising a request to transmit a user verification code to a user to whom the voice-interaction device was issued. In line with the discussion above, the data communication may further comprise a portion of identifying information that was provisioned on the voice-interaction device, such as identifying information for the voice-interaction device and/or identifying information for the user to whom the voice-interaction device was issued.

At 702, in line with the discussion above with reference to FIG. 4, based on the identifying information included in the data communication, the back-end computing platform may identify contact information for the user to whom the voice-interaction device was issued.

After identifying the contact information for the user to whom the voice-interaction device was issued, at 703, the back-end computing platform may generate a user verification code and cause a data communication comprising the user verification code to be transmitted to an end-user device associated with the user. As mentioned above, the back-end computing platform may store a representation of the user verification code for a period of time.

In turn, at 704, after causing the user verification code to be transmitted to the end-user device, the back-end computing platform may transmit a data communication to the voice-interaction device indicating that the user verification code was transmitted to the user.

At 705, in line with the discussion above with reference to FIG. 4, the back-end computing platform may receive a data communication comprising a request to verify the user verification code, which may include a representation of the user verification code that was received by the voice-interaction device from the user as spoken input.

At 706, the back-end computing platform may perform certain functionality for verifying the user verification code. For instance, the back-end computing platform may use the received representation to determine the user verification code that was spoken by the user (e.g., by extracting a textual representation or converting a digital audio representation to text) and then compare the user verification code spoken by the user against the user verification code that was generated for the user in order to determine a verification result. At 707, the back-end computing platform may then transmit a data communication indicating the verification result back to the voice-interaction device.

At 708, the back-end computing platform may receive a data communication comprising a request to carry out back-end functionality in order to facilitate a given activity selected by the user of the voice-interaction device via voice-based interaction. In line with the discussion above, the request may include (i) an indication (which may be encrypted) that the voice-interaction device has successfully authenticated the user (e.g., by validating a biometric input provided by the user), (ii) an indication of the given activity selected by the user, and perhaps also (iii) additional information received from the user (e.g., in follow-up interactions as described above) that may facilitate the given activity.

At 709, the back-end computing platform may validate the request, which may involve decrypting the indication that the voice-interaction device has successfully authenticated the user to obtain a confirmation that the user is authorized to engage in the given activity.

At 710, after successfully validating the request, the back-end computing platform may begin performing one or more functions in order to facilitate the given activity, as discussed above.

At 711, the back-end computing platform may transmit a data communication to the voice-interaction device indicating a response to the request. For instance, in line with the discussion above, the response may indicate whether or not the given activity has been or can be completed. In some instances, the response may additionally include information that is to be provided to the user by the voice-interaction device.

The example functionality 300, 400, 500, 600, and 700 of FIGS. 3-7 described above include one or more operations, functions, or actions as illustrated by steps 301-305, 401-418, 501-513, 601-611, and 701-711. While illustrated in sequential order, these steps may also be performed in parallel, and/or in a different order than those described above. Also, each of the example functionality 300-700 may be combined into fewer steps, divided into additional steps, and/or remove one or more steps, based upon the desired implementation. Furthermore, in the examples above, while one or more steps of the example functionality 300-700 depicted in FIGS. 3-7 may be described as being performed by certain one or more computing devices, it is possible that depending on the implementation, any one or more steps of the example functionality 300-700 may be performed by a different computing device, or may be split amongst one or more of the computing devices, shown in FIGS. 3-7.

Advantageously, as described above, the voice-interaction device and associated functionality disclosed herein provides visually-impaired users with the ability securely perform certain activities via voice-based interaction. In a preferred embodiment, the voice-interaction device may have a size and shape that makes the disclosed voice-interaction device easy to carry and use, such that it can be carried on a user's person without being obtrusive (e.g., by being placed in a pocket, in a purse, on a lanyard, or on a keychain, among other possibilities). Further, in a preferred embodiment, the disclosed voice-interaction device may not require a user to engage in any visual-based interaction in order to use the voice-interaction device, which may enable the voice-interaction device to be utilized more easily by visually-impaired individuals as well as other individuals that prefer voice-based interaction as opposed to visual-based interaction (e.g., users who may have difficulty interacting with more complex, multi-feature end-user devices such as smartphones, laptops, etc.). Indeed, given the focused design of the disclosed voice-interaction device, users will generally be able to engage in voice-based activities in a quicker and more seamless manner than if the users attempted to engage in those same activities by interacting with a software application installed on general-purpose end-user device (e.g., a smartphone) or interacting with an interactive voice response (IVR) system. Still further, the disclosed voice-interaction device generally provides enhanced security relative to a software application installed on a general-purpose end-user device (e.g., a smartphone). For instance, in a preferred embodiment, the disclosed voice-interaction device may only store a limed set of sensitive information related to the user (e.g., biometric information), may avoid the risk of such information being accessed by other software applications, may limit the extent of sensitive information about the user that is exchanged with a back-end computing platform, may exchange any such sensitive information in a secure manner (e.g., via secure communication protocol such as VoIP), and may optionally restrict the spoken output to a headphone device, among other ways that the voice-interaction device enhances security.

Given these advantages, the disclosed functionality for facilitating voice-based interaction will preferably be implemented using the type of voice-interaction device disclosed herein. However, in other implementations, it is possible that a general-purpose end-user device (e.g., a smartphone) could be installed with a software application that configures the general-purpose end-user device to carry out certain of the functionality disclosed herein for facilitating voice-based interaction.

For instance, in accordance with the present disclosure, a general-purpose end-user device could be installed with a software application that, when executed by one or more processors of the end-user device, causes the device to (i) operate in a first mode in which the device is operable to perform functions related to monitoring for a biometric input that serves to unlock additional functionality, (ii) while operating in the first mode, receive a biometric input via a biometric sensor, (iii) validate the received biometric input, (iv) based on determining that the biometric input is valid, transition from operating in the first mode to operating in a second mode during which the voice-interaction device permits the user to engage in certain activities via voice-based interaction, (v) produce a spoken output comprising an indication of one or more activities that are available to the user for selection, (vi) receive a spoken input, (vii) analyze the spoken input in order to determine whether the spoken input indicates selection of an available activity, (viii) transmit, to a back-end computing platform, a data communication comprising a request to carry out back-end functionality in order to facilitate the given activity selected by the user, (ix) receive a data communication comprising a response to the request, and (x) produce a spoken output based on the response, among other possible functionality.

However, if the disclosed functionality is implemented using a general-purpose end-user device rather than the type of voice-interaction device disclosed herein, it should be understood that certain of the advantages described above may no longer be present. For instance, implementing the disclosed functionality using a general-purpose end-user device may sacrifice at least some of the enhancements in user experience and security that may be provided by the type of voice-interaction device disclosed herein, although this implementation would still nevertheless provide advantages over existing technology for enabling voice-based interaction.

Figure 8:
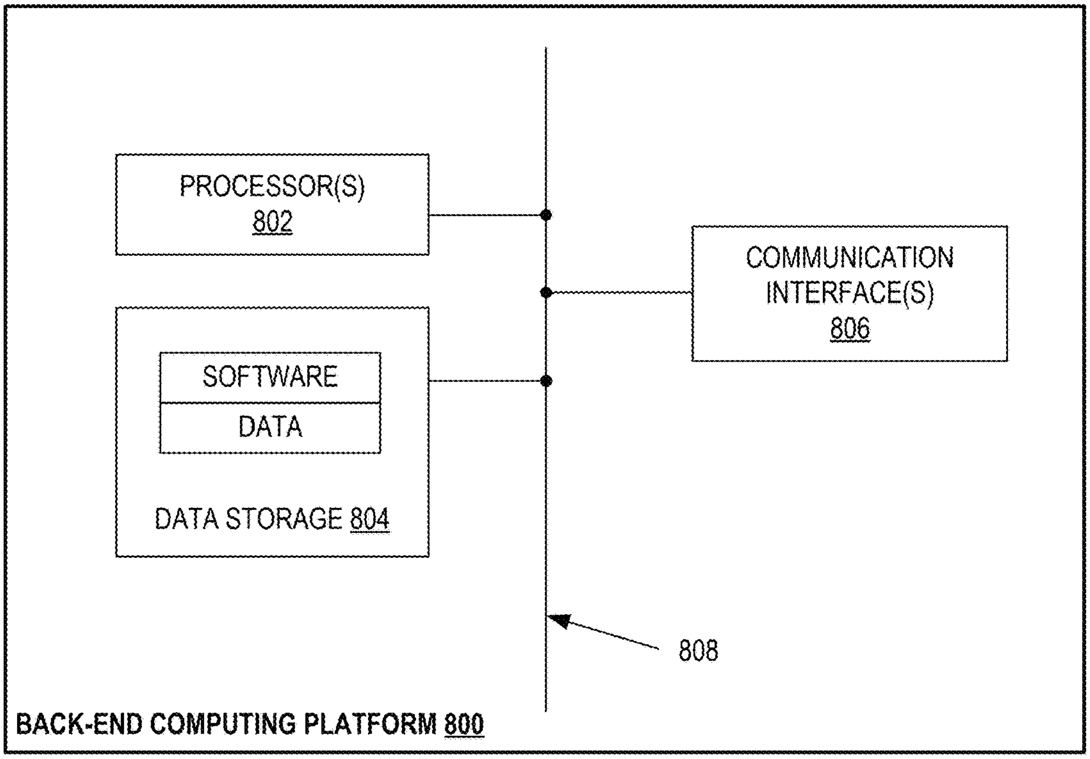
FIG. 8 depicts a structural diagram of an example back-end computing platform that may be configured to carry out one or more functions in accordance with the disclosed technology.

Turning now to FIG. 8, a simplified block diagram is provided to illustrate some structural components that may be included in an example back-end computing platform 800 that may be configured to carry out any of the various back-end platform functions disclosed herein, including but not limited to any of the back-end platform functions described above with reference to FIGS. 3-8. At a high level, the example back-end computing platform 800 may generally comprise any one or more computing systems that collectively include one or more processors 802, data storage 804, and one or more communication interfaces 806, all of which may be communicatively linked by a communication link 808 that may take the form of a system bus, a communication network such as a public, private, or hybrid cloud, or some other connection mechanism. Each of these components may take various forms.

The one or more processors 802 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. It should also be understood that the one or more processors 802 could comprise processing components that are distributed across a plurality of physical computing systems connected via a network.

In turn, the data storage 804 may comprise one or more non-transitory computer-readable storage mediums that are collectively configured to store (i) program instructions that are executable by one or more processors 802 such that the back-end computing platform 800 is configured to perform any of the various functions disclosed herein, including but not limited to any of the back-end-platform functions disclosed herein, and (ii) data that may be received, derived, or otherwise stored, for example, in one or more databases, file systems, repositories, or the like, by the back-end computing platform 800, in connection with performing any of the various back-end platform functions disclosed herein. In this respect, the one or more non-transitory computer-readable storage mediums of the data storage 804 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. It should also be understood that the data storage 804 may comprise computer-readable storage mediums that are distributed across a plurality of physical computing systems connected via a network.

The one or more communication interfaces 806 may be configured to facilitate wireless and/or wired communication with other systems and/or devices, such as voice-interaction devices and end-user devices. Additionally, in an implementation where the back-end computing platform 800 comprises a plurality of physical computing systems connected via a network, the one or more communication interfaces 806 may be configured to facilitate wireless and/or wired communication between these physical computing systems (e.g., between computing and storage clusters in a cloud network). As such, the one or more communication interfaces 806 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the back-end computing platform 800 may additionally include or have an interface for connecting to one or more user-interface components that facilitate user interaction with the back-end computing platform 800, such as a keyboard, a mouse, a trackpad, a display screen, a touch-sensitive interface, a stylus, a virtual-reality headset, and/or one or more speaker components, among other possibilities.

It should be understood that the back-end computing platform 800 is one example of a computing platform that may be used with the embodiments described herein. Numerous other arrangements are possible and contemplated herein. For instance, in other embodiments, the back-end computing platform 800 may include additional components not pictured and/or more or fewer of the pictured components.

Figure 9:
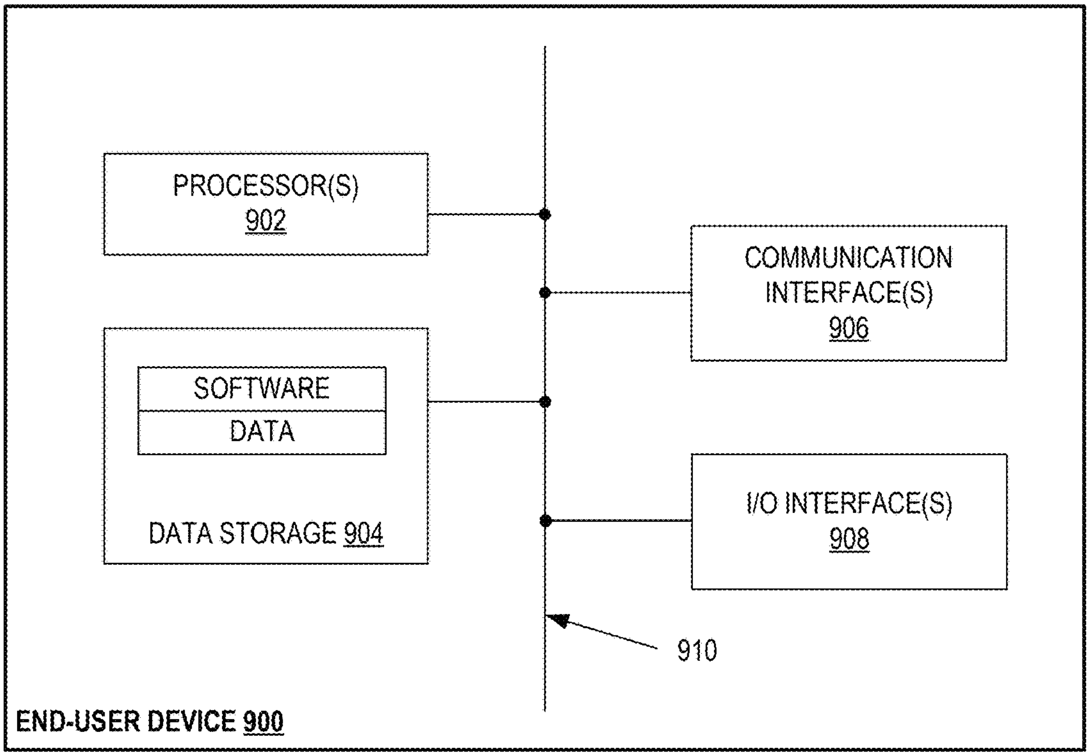
FIG. 9 depicts a structural diagram of an example end-user device that may be configured to communicate with an example back-end computing platform and also carry out one or more functions in accordance with the disclosed technology.

Turning next to FIG. 9, a simplified block diagram is provided to illustrate some structural components that may be included in an example end-user device 900 that may be configured to carry out any of the various functions disclosed herein, including but not limited to any of the end-user-device functions described above with reference to FIGS. 3-8. As shown in FIG. 9, the end-user device 900 may include one or more processors 902, data storage 904, one or more communication interfaces 906, and one or more input/output (I/O) interfaces 908, all of which may be communicatively linked by a communication link 910 that may take the form of a system bus or some other connection mechanism. Each of these components may take various forms.

The one or more processors 902 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 904 may comprise one or more non-transitory computer-readable storage mediums that are collectively configured to store (i) program instructions that are executable by the processor(s) 902 such that the end-user device 900 is configured to perform any of the end-user device functions disclosed herein, and (ii) data that may be received, derived, or otherwise stored, for example, in one or more databases, file systems, repositories, or the like, by the end-user device 900. In this respect, the one or more non-transitory computer-readable storage mediums of the data storage 904 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 904 may take other forms and/or store data in other manners as well.

The one or more communication interfaces 906 may be configured to facilitate wireless and/or wired communication with other computing devices. The communication interface(s) 906 may take any of various forms suitable to provide for any of various types of wireless communication (e.g., Wi-Fi communication, cellular communication, short-range wireless protocols, etc.) and/or wired communication. Other configurations are possible as well.

The end-user device 900 may additionally include or have interfaces for one or more I/O components 908 that facilitate user interaction with the end-user device 900, such as a keyboard, a mouse, a trackpad, a display screen, a touch-sensitive interface, a stylus, a virtual-reality headset, and/or one or more speaker components, among other possibilities.

It should be understood that the end-user device 900 is one example of an end-user device that may be used to interact with an example computing platform as described herein. Numerous other arrangements are possible and contemplated herein. For instance, in other embodiments, the end-user device 900 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A method carried out by a voice-interaction device, the method comprising:

operating in a first mode in which the voice-interaction device monitors for biometric input;

while operating in the first mode, receiving a biometric input via a biometric sensor;

validating the biometric input and thereby determining that the biometric input is valid;

based on determining that the biometric input is valid, transitioning from operating in the first mode to operating in a second mode in which the voice-interaction device is configured to (i) detect for continued presence of the biometric input and (ii) while the continued presence of the biometric input is detected, remain in the second mode and facilitate selection by a given user of an available activity via voice-based interaction with the voice-interaction device; and while operating in the second mode:

producing, via an audio output interface, a first spoken output that indicates at least one activity that is available for selection by the given user via voice-based interaction;

receiving, via an audio input interface, a spoken input from the given user;

based on an analysis of the spoken input, determining that the spoken input indicates a selection of a given activity that is available for selection by the given user; and based on determining that the spoken input indicates the selection of the given activity, causing the given activity to be initiated.

2. The method of claim 1, wherein the biometric sensor comprises a fingerprint sensor and wherein the biometric input comprises a fingerprint input.

3. The method of claim 1, wherein validating the biometric input and thereby determining that the biometric input is valid comprises:

capturing the biometric input;

generating a representation of the captured biometric input; and comparing the generated representation of the captured biometric input against one or more stored biometric representations and thereby determining that the generated representation of the captured biometric input matches at least one of the one or more stored biometric representations.

4. At least one non-transitory computer-readable medium, wherein the at least one non-transitory computer-readable medium is provisioned with program instructions that, when executed by at least one processor, cause a voice-interaction device to:

operate in a first mode in which the voice-interaction device monitors for biometric input;

while operating in the first mode, receive a biometric input via a biometric sensor;

validate the biometric input and thereby determine that the biometric input is valid;

based on determining that the biometric input is valid, transition from operating in the first mode to operating in a second mode in which the voice-interaction device is configured to (i) detect for continued presence of the biometric input and (ii) while the continued presence of the biometric input is detected, remain in the second mode and facilitate selection by a given user of an available activity via voice-based interaction with the voice-interaction device; and while operating in the second mode:

produce, via an audio output interface, a first spoken output that indicates at least one activity that is available for selection by the given user via voice-based interaction;

receive, via an audio input interface, a spoken input from the given user;

based on an analysis of the spoken input, determine that the spoken input indicates a selection of a given activity that is available for selection by the given user; and based on determining that the spoken input indicates the selection of the given activity, cause the given activity to be initiated.

5. The at least one non-transitory computer-readable medium of claim 4, wherein the biometric sensor comprises a fingerprint sensor and wherein the biometric input comprises a fingerprint input.

6. The at least one non-transitory computer-readable medium of claim 4, wherein the program instructions that, when executed by the at least one processor, cause the voice-interaction device to validate the biometric input and thereby determine that the biometric input is valid comprise program instructions that, when executed by the at least one processor, cause the voice-interaction device to:

capture the biometric input;

generate a representation of the captured biometric input; and compare the generated representation of the captured biometric input against one or more stored biometric representations and thereby determine that the generated representation of the captured biometric input matches at least one of the one or more stored biometric representations.

7. A voice-interaction device comprising:

a biometric sensor;

an audio output interface;

an audio input interface;

at least one processor;

at least one non-transitory computer-readable medium; and program instructions stored on the at least one non-transitory computer-readable medium that are executable by the at least one processor such that the voice-interaction device is configured to:

operate in a first mode in which the voice-interaction device monitors for biometric input;

while operating in the first mode, receive a biometric input via the biometric sensor;

validate the biometric input and thereby determine that the biometric input is valid;

based on determining that the biometric input is valid, transition from operating in the first mode to operating in a second mode in which the voice-interaction device is configured to (i) detect for continued presence of the biometric input and (ii) while the continued presence of the biometric input is detected, remain in the second mode and facilitate selection by a given user of an available activity via voice-based interaction with the voice-interaction device; and while operating in the second mode:

produce, via the audio output interface, a first spoken output that indicates at least one activity that is available for selection by the given user via voice-based interaction;

receive, via the audio input interface, a spoken input from the given user;

based on an analysis of the spoken input, determine that the spoken input indicates a selection of a given activity that is available for selection by the given user; and based on determining that the spoken input indicates the selection of the given activity, cause the given activity to be initiated.

8. The voice-interaction device of claim 7, wherein the biometric sensor comprises a fingerprint sensor and wherein the biometric input comprises a fingerprint input.

9. The voice-interaction device of claim 7, wherein the program instructions that are executable by the at least one processor such that the voice-interaction device is configured to validate the biometric input and thereby determine that the biometric input is valid comprise program instructions that are executable by the at least one processor such that the voice-interaction device is configured to:

capture the biometric input;

generate a representation of the captured biometric input; and compare the generated representation of the captured biometric input against one or more stored biometric representations and thereby determine that the generated representation of the captured biometric input matches at least one of the one or more stored biometric representations.

10. The voice-interaction device of claim 7, wherein the program instructions that are executable by the at least one processor such that the voice-interaction device is configured to cause the given activity to be initiated comprise program instructions that are executable by the at least one processor such that the voice-interaction device is configured to:

transmit, to a computing platform configured to facilitate activities selected by the given user, a request on behalf of the given user to facilitate the given activity;

receive, from the computing platform, a response to the request; and produce, via the audio output interface, a second spoken output indicating the response to the request.

11. The voice-interaction device of claim 10, wherein the request on behalf of the given user to facilitate the given activity includes (i) an indication that the voice-interaction device has successfully authenticated the given user and (ii) an indication of the given activity.

12. The voice-interaction device of claim 11, wherein the indication that the voice-interaction device has successfully authenticated the given user comprises a data communication confirming that the given user is authorized to engage in the given activity, wherein the data communication is encrypted using a randomly generated, unique code that indicates a particular decrypting algorithm that is to be used by the computing platform to decrypt the data communication.

13. The voice-interaction device of claim 7, wherein the at least one activity that is available for selection by the given user via voice-based interaction includes at least one of (i) checking an account balance for a given financial account, (ii) scheduling a payment related to a given financial account, or (iii) transferring funds from a first financial account to a second financial account.

14. The voice-interaction device of claim 7, wherein the first spoken output that indicates the at least one activity that is available for selection by the given user via voice-based interaction further indicates, for each respective activity, one or more corresponding responses that may be spoken by the given user to indicate selection of the respective activity.

15. The voice-interaction device of claim 7, further comprising program instructions stored on the at least one non-transitory computer-readable medium that are executable by the at least one processor such that the voice-interaction device is configured to:

before determining that the biometric input is valid, determine that the biometric input is not valid;

receive a second spoken input indicating a request to store the biometric input; and based on the request, authenticate the given user for storing the biometric input.

16. The voice-interaction device of claim 15, wherein the program instructions that are executable by the at least one processor such that the voice-interaction device is configured to authenticate the given user for storing the biometric input comprise program instructions that are executable by the at least one processor such that the voice-interaction device is configured to:

transmit, to a computing platform configured to authenticate the given user, a request to issue an original user verification code to the given user;

receive a third spoken input comprising a spoken user verification code;

based on a comparison of (i) the spoken user verification code and (ii) the original user verification code, determine that the spoken user verification code matches the original user verification code and thereby determine that the spoken user verification code is valid; and based on determining that the spoken user verification code is valid, store a captured representation of the biometric input.

17. The voice-interaction device comprising of claim 16, further comprising program instructions stored on the at least one non-transitory computer-readable medium that are executable by the at least one processor such that the voice-interaction device is configured to:

use one or more speech processing techniques to generate a text representation of the spoken user verification code;

transmit, to the computing platform, a request to verify the spoken user verification code, wherein the request includes the text representation of the spoken user verification code; and receive, from the computing platform, a response indicating that the text representation of the spoken user verification code matches the original user verification code.

18. The voice-interaction device of claim 16, further comprising program instructions stored on the at least one non-transitory computer-readable medium that are executable by the at least one processor such that the voice-interaction device is configured to:

use one or more speech processing techniques to generate a text representation of the spoken user verification code;

obtain, from the computing platform, a text representation of the original user verification code; and compare (i) the text representation of the spoken user verification code and (ii) the text representation of the original user verification code to determine if the spoken user verification code matches the original user verification code.

19. The voice-interaction device of claim 7, further comprising program instructions stored on the at least one non-transitory computer-readable medium that are executable by the at least one processor such that the voice-interaction device is configured to, while operating in the second mode:

determine that the continued presence of the biometric input is no longer detected; and based on determining that the continued presence of the biometric input is no longer detected, either:

cease operating in the second mode; or prompt the given user to continue providing the biometric input.

20. The voice-interaction device of claim 7, further comprising program instructions stored on the at least one non-transitory computer-readable medium that are executable by the at least one processor such that the voice-interaction device is configured to:

determine whether the voice-interaction device is connected to a headphone device; and if the voice-interaction device is not connected to the headphone device, restrict voice-based interaction with the voice-interaction device while operating in the second mode.

* * * * *